US011918999B2

(12) United States Patent
McNeely et al.

(10) Patent No.: US 11,918,999 B2
(45) Date of Patent: Mar. 5, 2024

(54) INTERFACE TO LATERAL FLOW

(71) Applicant: GattaCo Inc., Murrieta, CA (US)

(72) Inventors: Michael Ryan McNeely, Murrieta, CA (US); Mahmoud Zubaidi, Murrieta, CA (US)

(73) Assignee: GattaCo Inc., Murrieta, CA (US)

( * ) Notice: Subject to any disclaimer, the term of this patent is extended or adjusted under 35 U.S.C. 154(b) by 201 days.

(21) Appl. No.: 17/095,614

(22) Filed: Nov. 11, 2020

(65) Prior Publication Data

US 2021/0138460 A1 May 13, 2021

Related U.S. Application Data

(60) Provisional application No. 62/933,584, filed on Nov. 11, 2019.

(51) Int. Cl.
*B01L 3/00* (2006.01)

(52) U.S. Cl.
CPC ..... *B01L 3/502707* (2013.01); *B01L 2200/12* (2013.01); *B01L 2300/043* (2013.01); *B01L 2300/0609* (2013.01); *B01L 2300/069* (2013.01); *B01L 2300/0825* (2013.01); *B01L 2300/0887* (2013.01)

(58) Field of Classification Search
CPC ........... B01L 3/502707; B01L 2200/12; B01L 2300/043; B01L 2300/0609; B01L 2300/069; B01L 2300/0825; B01L 2300/0887; B01L 2200/0605; B01L 2200/0684; B01L 2300/0681; B01L 2400/0677; B01L 3/5023; G01N 33/558; G01N 33/491
See application file for complete search history.

(56) References Cited

U.S. PATENT DOCUMENTS 10,532,325 B2 1/2020 Mcneely
2005/0227370 A1* 10/2005 Ramel ...................... C12Q 1/00 436/514
2014/0205503 A1* 7/2014 LaBorde ............. G01N 33/558 427/398.1
2017/0087517 A1* 3/2017 McNeely ............. G01N 33/491
2020/0378957 A1* 12/2020 Azpiroz ............... G01N 33/536

FOREIGN PATENT DOCUMENTS

WO WO-2017015243 A1 * 1/2017 ............. A61M 1/36

* cited by examiner

*Primary Examiner* — Matthew D Krcha
*Assistant Examiner* — Sophia Y Lyle
(74) *Attorney, Agent, or Firm* — Schwegman Lundberg & Woessner, P.A.

(57) ABSTRACT

Disclosed are methods and devices for interfacing to or interacting with the flow of liquid passing into or through lateral-flow assays and related paper- or membrane-based in-vitro diagnostic testing platforms. This is done for the purpose of improving their performance, sensitivity, accuracy, repeatability, degree of multiplexing, and/or level of quantitation, and/or reducing their inherent limitations while maintaining, in large part, their simplicity, cost effectiveness, and ease of use. New methods are disclosed for pre-sample purification, aliquoting, sequential liquid delivery, flow control and other functions that are largely automatic and require no action on the part of the user.

19 Claims, 10 Drawing Sheets

INTERFACE TO LATERAL FLOW

CROSS-REFERENCE TO RELATED APPLICATIONS

This application claims priority to and the benefit of U.S. Provisional Patent Application No. 62/933,584, filed on Nov. 11, 2019, which is hereby incorporated herein by reference in its entirety.

TECHNICAL FIELD

This disclosure relates to methods and devices for interfacing to or interacting with the flow of liquid passing into or through lateral flow assays and related paper- or membrane-based in-vitro diagnostic testing platforms for the purpose of improving their performance and reducing their inherent limitations while maintaining their simplicity, cost effectiveness, and ease of use.

BACKGROUND

Lateral flow assays are a ubiquitous platform primarily used for qualitative testing of a single analyte, target, or biomarker. They have many favorable features that contribute to their widespread use, including low cost and ease of use. Invariably, attempts to improve the platform lead to increased complexity of use and higher costs. While an increase in cost or price for improved performance is often justifiable, the increased complexity of use tends to reduce the market opportunity associated with later flow assays, including limiting access for those individuals who would benefit from them.

The objectives of improving the platform include improved accuracy, sensitivity, detection range, and repeatability, converting from qualitative to quantitative or semi-quantitative analysis, simplifying the workflow, reducing processing steps, integrating digital sensors, adding thermal or cooling element for nucleic acid amplification, and/or increasing the number of analytes or targets measured in each test from one to two or more.

To achieve these improvements, multiple strategies have been implemented that almost without exception require the user of the test to perform some manual processing step in addition to simply placing a sample in its appropriate location and observing the test results.

Some of these additional steps include precisely measuring the sample volume prior to loading it in the test, following the addition of sample (precisely measured or not) with a specific amount of liquid reagent or buffer to the same location as the sample or to another input port, mixing a measured volume of sample with a liquid reagent prior to loading the combined volume on the test, manually sliding a lever or cover or pushing a button at a prescribed time to initiate some process within the test, and other similar steps.

While the addition of a single simple manual step, such as pushing a button, will have minimal impact on the availability of the test if it improves performance, requiring multiple additional steps including precise timing of steps or measurements of liquids, can lead to a significant restriction on the test's availability, sometimes due to a regulatory requirement that only trained technicians are allowed to perform the test.

In addition, as versatile and robust as the lateral flow platform is, it also suffers from inherent weaknesses that cannot be overcome using conventional technology. For example, these weaknesses include a limit on the number of targets or analytes that can be effectively measured in a single test, and flow inconsistencies leading to poor repeatability. Further, although the volume of a sample or reagent that is added to the test can be measured, due to natural separation processes that take place within the membranes and pads that are used in the platform, using conventional technology, it is difficult to know exactly the volume of a sample, or portion of a sample, that is actually analyzed.

SUMMARY

The disclosed technology details a new method or process for automatically or passively aliquoting liquids into single or multiple metered volumes, including aliquots of a liquid that has passed through a size exclusion filter. These aliquots are sequentially delivered to the pads and membranes forming a lateral flow assay or other paper- or membrane-based or microfluidic testing platform. The purpose is to improve the performance of the testing platform easily and economically.

The methods of aliquoting, separating, filtering, and extracting make use of a mechanism herein referred to as capillary pressure re-set technology. This technology makes use of a soluble matrix that has a high enough capillarity, or capillary drawing force, to draw liquid through a hydrophilic membrane or filter under passive capillary forces, thereby eliminating the membrane's inherent breakthrough pressure, and that then dissolves or disintegrates in the extracted liquid and releases the liquid into a new geometry that has lower or less capillarity, This new capability, in addition to other design features and capabilities discussed in this disclosure, allow for multiple processing steps, liquid and reagent deliveries, and other sophisticated processes to be performed automatically under the natural driving forces that exist in the lateral flow structure.

An example of one process made possible by the disclosed technology is to separate plasma from whole blood, meter its volume, and deliver it back into the lateral flow structure, all with no effort or action on the part of the user other than adding a sufficient volume of whole blood to the sample input of the test. This capability eliminates hematocrit variability that significantly impacts the accuracy of blood testing platforms and allows an inherently qualitative platform to become quantitative.

Another capability made possible by the disclosed technology is to extract liquid from a membrane and deliver it to a highly multiplexed microarray structure, reducing or eliminating the inherent weakness of lateral flow in performing highly multiplexed analysis. Alternatively, the technology can modify the lateral flow assay by eliminating the nitrocellulose membrane component and replacing it with microchannels. The plasma or other extracted liquid can be released from the sample pad passively into a designed microfluidic structure, where it may be drawn forward using passive capillary forces or positive or negative pressure gradients. The microfluidic channels can be fitted with sensors (bioelectronic, electrochemical, or organic) where detection may happen instantly, quantitatively, and with higher sensitivity. The microfluidic structure can also include multiple sensors for control and multiplexing.

Several examples of how the technology is used, with either precious (e.g., blood) or abundant (e.g., urine) samples are disclosed. The use of the technology with precious samples often includes the implementation of a breakable buffer-filled ampule or reagent pouch, the liquid of which may also be aliquoted and used for performing additional reagent delivery or washing steps.

In one aspect, this disclosure describes a lateral flow assay device including a lateral flow membrane; a transfer pad overlapping with the lateral flow membrane; a spacer adjacent to the transfer pad; a pooling layer disposed on the spacer and the transfer pad and laterally defining a filtrate pooling chamber; a sample pad (e.g., a filtration membrane such as a plasma separation membrane) disposed on top of the pooling layer, the filtrate pooling chamber being vertically defined between the sample pad and the spacer and transfer pad; and a soluble matrix contained in the filtrate pooling chamber and in contact with both the sample pad and the spacer. The soluble mattix possesses a capillary drawing force sufficient to draw, upon application of a liquid sample to the sample pad, a filtrate extracted from the sample pad into the soluble matrix, causing the soluble matrix to at least partially dissolve or disintegrate in the filtrate, whereby the filtrate is released into the filtrate pooling chamber for delivery from the filtrate pooling chamber via the transfer pad to the lateral flow membrane. The device may further include a vent in the pooling layer, wherein the vent, soluble matrix, transfer pad, filtrate pooling chamber, and sample pad are configured to facilitate transfer of a metered aliquot of filtrate from the filtrate pooling chamber to the transfer pad. For example, the vent, soluble matrix, and transfer pad may be positioned relative to the filtrate pooling chamber to cause the filtrate pooling chamber to empty into the transfer pad upon substantially complete filling (e.g., filling of at least 95% of the volume) of the filtrate pooling chamber, whereby the metered aliquot is substantially equal in volume to the filtrate pooling chamber. In addition, the lateral flow assay device may include an inlet capillary tube of uniform diameter and configured to deliver at least a specified minimum volume of the liquid sample to an upstream surface of the sample pad. The lateral flow assay device may further include an absorbing pad overlapping with the lateral flow membrane downstream of the transfer pad, the absorbing pad having a higher capillarity than the lateral flow membrane, and a base card structure, on which at least portions of the lateral flow membrane, the transfer and absorbing pads, and the spacer are disposed.

In some embodiments, the lateral flow assay device includes an additional (second) transfer pad and the filtrate pooling layer further laterally defines an additional (second) filtrate pooling chamber containing an additional (second) soluble matrix, where the additional filtrate pooling chamber is vertically defined between the sample pad on one (e.g., the top) side and the spacer and additional transfer pad on the other (e.g., the bottom) side. The two transfer pads may be placed on opposite sides of the spacer, and one of them may overlap with the lateral flow membrane while the other one overlaps with a transport membrane included in the device, overlapping with the lateral flow membrane. In this embodiment, the lateral flow assay device may further include a base card structure, wherein at least portions of the lateral flow membrane and the transport membrane are disposed on the base card structure and the spacer is disposed on the lateral flow membrane and the transport membrane. In certain particular embodiments, the sample pad is a portion of a wick that is configured such that the liquid sample flowing along the wick reaches the filtrate pooling area overlapping with the first transfer pad (which overlaps, in turn, with the lateral flow membrane) before it reaches the filtrate pooling area overlapping with the second transfer pad (which overlaps, in turn, with the transport membrane). The wick may also include a second portion (downstream of the sample pad) that is in direct contact with the transfer membrane. Alternatively to being placed on opposite sides of the spacer, the two transfer pads may be placed side-by-side on the same side of the spacer, both overlapping with the lateral flow membrane. The device may include an L-shaped base card structure having first and second portions extending in substantially mutually perpendicular directions, with the lateral flow membrane being disposed on the first portion of the L-shaped base card structure, and at least portions of the transfer pads and the spacer being disposed on the second portion of the L-shaped base card structure.

In some embodiments, the lateral flow assay device further includes (instead of or in addition to a second transfer pad) a microchannel defined collectively by a channel base, a channel layer on top of the channel base, and a channel cover on top of the channel layer. A portion of the filtrate pooling layer is disposed on top of the channel cover, and the portion of the filtrate pooling layer and an opening in the channel cover together laterally define an additional (e.g., second) filtrate pooling chamber, vertically defined between the sample pad and the channel base. This second filtrate pooling chamber is fluidically connected to the microchannel, and contains an additional (e.g., second) soluble matrix in contact with both the sample pad and the channel base, the additional soluble matrix possessing a capillary drawing force sufficient to draw additional filtrate through the sample pad and into the additional soluble matrix, causing the additional soluble matrix to at least partially dissolve or disintegrate in the additional filtrate, whereby the additional filtrate is released into the additional filtrate pooling chamber for delivery from the additional filtrate pooling chamber to the microchannel. The device may further include an electronic, thermal, or optical element in the microchannel.

In another aspect, this disclosure pertains to a method of extracting filtrate from a sample pad passively under capillary action to fill a filtrate pooling chamber, drawing the filtrate from the filtrate pooling chamber into a transfer pad that forms a partial boundary of the filtrate pooling chamber; and drawing the filtrate from the transfer pad into a lateral flow membrane overlapping with the transfer pad. The sample pad may be or include a filtration membrane, which separates the filtrate from a retentate contained in a liquid sample applied to the sample pad. To extract the filtrate from the sample pad, a soluble matrix placed in the filtrate pooling chamber in physical contact with a downstream surface of the sample pad is used. The soluble matrix serves to overcome an initial breakthrough pressure of the sample pad, and then at least partially dissolves or disintegrates in the filtrate, thereby releasing the extracted filtrate into the filtrate pooling chamber, causing a meniscus to form between the downstream surface of the sample pad and a bottom surface of the filtrate pooling chamber. The meniscus flows across the downstream surface of the sample pad as filtrate continues to be drawn into the filtrate pooling chamber. The filtrate may be metered by venting the filtrate pooling chamber through a vent in a wall of the filtrate pooling chamber as the filtrate is drawn into the transfer pad. The method may further include applying a liquid sample to the sample pad via an inlet capillary tube of uniform diameter placed at an upstream surface of the sample pad, the inlet capillary tube sized to deliver at least a specified minimum volume of the liquid sample to the sample pad.

In some embodiments, the method involves extracting filtrate from the sample pad passively under capillary action to fill two filtrate pooling chambers, using an additional (second) soluble matrix placed in the second filtrate pooling chamber in physical contact with the downstream surface of the sample pad to overcome the initial breakthrough pressure of the sample pad. The filtrate from the additional filtrate pooling chamber may be drawn into an additional (second) transfer pad that forms a partial boundary of the additional filtrate pooling chamber, and then from the additional transfer pad into a transport membrane overlapping with the additional transfer pad, and from the transport membrane into the lateral flow membrane in a region of the overlap between the transport membrane and the lateral flow membrane. In some embodiments, the sample pad is a portion of a wick, and the method further includes drawing liquid sample directly from the wick into the transport membrane in a region of overlap between the wick and the transport membrane, the region being downstream, along the wick, of the sample pad. Alternatively or additionally to drawing filtrate into a second transfer pad, the filtrate may be drawn from the additional filtrate pooling chamber into a microchannel.

In yet another aspect, this disclosure provides a device including a base support; disposed on the base support, a first membrane and a second membrane defining a gap therebetween; a hydrophilic bridge cover disposed above the gap and extending from the first membrane to the second membrane; and a soluble matrix in contact with the first membrane and an underside of the bridge cover. The soluble matrix possesses a capillary drawing force sufficient to draw liquid out of the first membrane and into the soluble matrix, causing the soluble matrix to at least partially dissolve or disintegrate in the liquid, whereby the liquid is released into a space defined between the bridge cover and the base support and caused to pass across the gap to be reabsorbed into the second membrane. The device may further include walls extending along the gap and supporting the bridge cover, and the soluble matrix may extend, in this case, between a top surface of the first membrane and the underside of the bridge cover. The walls may slope down towards the second lateral flow membrane. In an alternative configuration, the soluble matrix may contact the first membrane at an end face of the first membrane, and the bridge cover may be supported directly by the first and second membranes.

The device may further include a reagent, a microarray printed on the base support, and/or a sensor in the gap. In some embodiments, the device includes a microarray base disposed on the base support, and a microarray formed on the microarray base in the gap between the first and second membranes. The microarray base may include a lateral flow membrane, and the first and second membranes may overlap with the lateral flow membrane such that liquid is drawn out of the first membrane both into the lateral flow membrane and into the space defined between the bridge cover and the base support. Alternatively, the device may include a microarray base is butted up against the first and second membranes.

In a further aspect, a method is disclosed that involves passively drawing liquid, under capillary action, from a first membrane disposed on a base support into a soluble matrix placed in physical contact with the first membrane, whereupon the soluble matrix at least partially dissolves or disintegrates in and thereby releases the liquid; passing the liquid across a gap between the first membrane and a second membrane disposed on the base support under capillary action on a meniscus formed between the base support and a hydrophilic bridge cover extending over the gap from the first membrane to the second membrane; and drawing the liquid into the second membrane. The liquid, when passing across the gap, may pass over a microarray disposed on or above the base support in the gap.

BRIEF DESCRIPTION OF THE DRAWINGS

The following drawings illustrate exemplary embodiments. There are, in fact, many possible liquids that may be processed, many possible membrane or microchannel configurations, housings, flow systems, entrance and exit point designs, flow patterns, soluble matrix placements, dimensions and geometries, and liquid flow driving forces possible in various embodiments. The following examples only serve to illustrate principles discussed in this disclosure, and are not meant to be limiting in any way in converting the principles discussed in this disclosure into physical form, and are not necessarily to scale as may be used in a physical system. Like reference numerals refer to like parts in different views or embodiments.

DETAILED DESCRIPTION

Lateral Flow Assays: Lateral flow assays (LFA), or lateral flow immuno-assays (LFIA), or immunochromatographic assays (ICA), or lateral flow tests, test strips or strip tests, all reference a similar set of flow, reaction, capture, material composition, and analysis methodologies developed for in-vitro diagnostics. Sometimes these are referred to as paper-based or membrane-based assays. However, lateral flow assays typically involve liquid flow along a single line of direction, whereas sonic paper or membrane-based assays are referred to as 2-dimensional, or 2D, paper-based assays, where flow can branch in an orthogonal direction although still bounded by a planar geometry. The disclosed technology can work with either format, or virtually any format of paper- or membrane-based assay platform such as lateral flow, 2D, or other types of platforms. Reference will be made primarily to lateral flow structures, although this is not intended to be limiting in any way. Applications of these assays include human medical testing, veterinary medicine, food testing, and environmental diagnostics. The reference to immuno in the name is slowly fading due to a broader range of target and capture biomolecules used in the testing format, including phage, nucleic acids, affimers, and other structures.

Figure 1A:
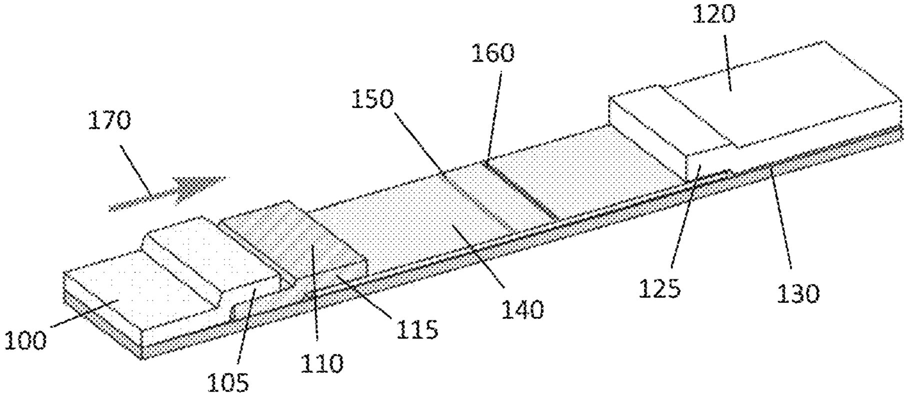
FIG. 1A Prior Art
FIGS. 1A and 1B illustrate traditional (1A) and modified, yet still common, (1B) lateral flow assay designs and structures for reference in discussing features of the invention.

FIG. 1A illustrates a typical or classical design of a lateral flow test, specifically for the example of blood testing, where the sample pad (100) may also be a plasma separation membrane (PSM). As a blood sample is placed on the sample pad (100), plasma or serum filters out of the sample pad (100) and into a reagent pad (110), or conjugate pad, where it resorbs a stored reagent, typically conjugate. This transport from the sample pad (100) to the conjugate or reagent pad (110) is possible due to the overlap (105) of the two membranes. The conjugate is a reagent dried in the reagent pad (110) that is designed to possess a labeling moiety or component or functional group, such as a fluorophore, and a binding moiety. The binding moiety or component is designed to bind to a particular target, or biomarker of interest, in the sample. A biomarker is a biological molecule that is an indicator of some condition. For example, an antibody produced in the body in response to the presence of a disease is an indicator of the presence of the disease. The antibody may be easier to capture, detect, and quantify than the disease itself.

The sample, resorbed conjugate and biomarker-conjugate complex then flow into the lateral flow membrane (140) (e.g., of nitrocellulose), due to overlap between the conjugate or reagent pad (110) with the lateral flow membrane (140). (Below, the reagent or conjugate pad is also more generally referred to as a "transfer pad," reflecting its function of transferring liquid to another membrane, to also allow for cases where the pad does not include any conjugate or reagent.) On the lateral flow membrane (140), typically, two lines of capturing biomolecules have been laid down. One line is referred to as the test or result line (150) and one line is the control line (160). The control line (160) is designed to capture the conjugate alone, or the conjugate bound to another biomolecule present in the sample that is not the target biomarker. It may be the same conjugate that binds to the biomarker in the sample, or it may be a different conjugate stored together with the primary biomarker conjugate. This flow into the lateral flow membrane (140) is possible due to the overlap (115) between the reagent pad (110) and the lateral flow membrane (140).

The result or test line (150) is designed to capture the biomarker, or biomarker-conjugate complex, as it flows past the line in the lateral flow membrane (140). The remaining sample and conjugate, and some biomarker-conjugate complex that are not captured, flow past the lines and into the absorbing pad or wick (120) at the far end of the strip. This is possible due to the overlap (125) of the absorbing pad (120) with the lateral flow membrane (140). All pads and membranes are supported and adhered to a base card structure (130), to give the system some mechanical rigidity and handleability.

The dynamics of flow through the membranes and pads is based primarily on capillary forces and flow rates governed by porosity of the membranes or pads, pore size, membrane or pad material composition, thickness, and sample composition. Flow may be in both directions from where the sample or liquid is placed on the strip (upstream and downstream) and is based on dynamics where the flow of liquid attempts to eventually establish an equilibrium condition. However, the proper selection of membrane materials generally encourages flow in the downstream direction (170), toward the absorbing pad (120). Once the liquid or sample reaches the absorbing pad or wick (120), it fills the pad, and flow upstream of the pad (120), such as across the result (150) and control (160) lines, continues as long as the absorbing pad (120) continues to absorb and there is sample or liquid remaining upstream in the strip. Usually the assay is designed to take anywhere between 5 and 30 minutes, whereas an equilibrium condition may take hours or longer. The equilibrium can also be disrupted due to the possibility of evaporation, so strips are usually enclosed within a plastic cartridge to minimize the effect of ambient conditions, at least over the intended time duration of the test. Cartridges are important to ensure the reliable operation of a strip. However, they are not included in the illustrations or discussion further as they are generally not important in describing the applications and technology disclosed here.

The leading edge of liquid or sample moves from one pad or membrane into the next due to an increased capillarity of the new membrane it encounters, which draws the liquid into it. This capillarity acts as a type of suction force due to the attraction of surface charges of the membrane with the surface tension of the liquid. If a lagging end, or back end, of flow is established, where there is an interface between the lagging end of a liquid stream and air, the capillarity or capillary forces that exist at the lagging end acts as a resistance to flow, or drag, which could stop flow altogether. However, assuming this condition does not exist, the increased capillarity of each successive membrane or pad that the leading end of flow encounters will continue to draw liquid forward, across all membranes and into the absorbing pad. Typically, the capillarity of the absorbing pad is the highest throughout the system, including high enough to overcome any capillarity or drag at the lagging end of flow which may be established. Also, by the time lagging forces become significant, usually enough sample and reagent have flowed past the result and control lines that the test is finished, and the results can be determined.

The membranes or pads may be made of many different materials, selected depending on the flow dynamics, reagents, and reactions speed requirements of the test. They are also often modified with different coatings, binders, fillers, blocking agents, or other chemistries to facilitate their use. Examples of the core materials for the primary reaction membranes and other membranes or pads include nitrocellulose, cellulose acetate, natural or synthetic cellulose, polyester, polyethersulfone, or glass fiber.

To use a lateral flow assay, such as the one illustrated in FIG. 1A, a sample, such as blood or urine or saliva, is placed on the sample pad (100). After a few minutes, the result (150) and control (160) lines are observed, usually with the unaided eye. The status of the result and control lines (such as visible, not visible, in the shape of a plus or minus, or some other characteristic), indicates whether the test was positive or negative of the presence of the biomarker in the sample. The exact features of the result and control lines, and whether they indicate positive or negative or inconclusive outcomes or test failure, vary from test to test depending on how it is designed and on the assay chemistry that is used (such as sandwich or competitive assays). However, instructions for performing the test and reading and interpreting the results should be clearly available to the user and easy to understand.

In most circumstances, with a lateral flow assay that is as easily used as has been described, the results would be for measuring the presence or absence of a single biomarker or target. This is for qualitative analysis, or yes or no results as to the presence of the biomarker in the sample. Numerical values or concentrations of the biomarker in the sample are not common due to the inherent weaknesses of the lateral flow platform.

Depending on which biomarker is tested for and its clinical significance, and the ease or difficulty in following a test procedure and understanding its results, a regulatory organization that is recognized and has authority for regulating the use of in-vitro diagnostics within a certain region, such as the Food and Drug Administration (FDA) in the United States, or the CFDA in China, may allow the test to be used broadly without restriction, or it may impose some level of restrictions such as that the test may only be performed by specially trained technicians, or the results may only be made available to the individual by an appropriate health counselor.

Although the restrictions that may be imposed by a regulatory agency may be considered suitable and appropriate, and even be implemented to safeguard the safety of the intended user, the unavoidable result of any restriction, no matter how suitable, is to limit the extent to which the test is available to those who may benefit from it.

However, in the case when a diagnostic test has a restriction primarily due to its complexity of use rather than a limitation on making the test result directly available to the user, then the restrictions that may be imposed by a regulatory body also reduces the potential market opportunity, and hence revenue, of the test developer.

The test procedure that was mentioned previously, for using a lateral flow assay device for a qualitative test of a single biomarker, is an example of a test that is, typically, unrestricted for use due to its lack of complexity, or its ease of use. Its use may still be restricted due to the clinical significance of the target biomarker, but otherwise the test may be broadly available. An example of a simple lateral flow assay that has no commercial or regulatory restrictions imposed upon it is a urine-based pregnancy test.

There are many tests, or many biomarkers that could be tested for or measured, that have no or low restriction of use based upon their clinical significance, but are significantly restricted due to the complexity of the test procedure itself. Some of the test procedures that may disqualify a test from unrestricted use include precise measurement requirements; need to manually add multiple reagents, in addition to the sample, to the test, especially if there is a strict timing requirement on when the reagent is added; some mixing or shaking steps; and other manual procedures.

While the lateral flow assay is inherently useful for qualitative applications of a single biomarker, it is often desired to extend its use and applicability to quantitative testing (obtaining a precise measurement or concentration of a target) of single or multiple biomarkers. Detection of multiple biomarkers in a single sample input is referred to as multiplexing.

Invariably, with the current state of technology, as soon as a lateral flow assay is modified (from the procedure discussed previously) in order to increase its sensitivity or convert it into a quantitative or multiplexed assay, its complexity is increased and it is disqualified from unrestricted use.

Figure 1B:
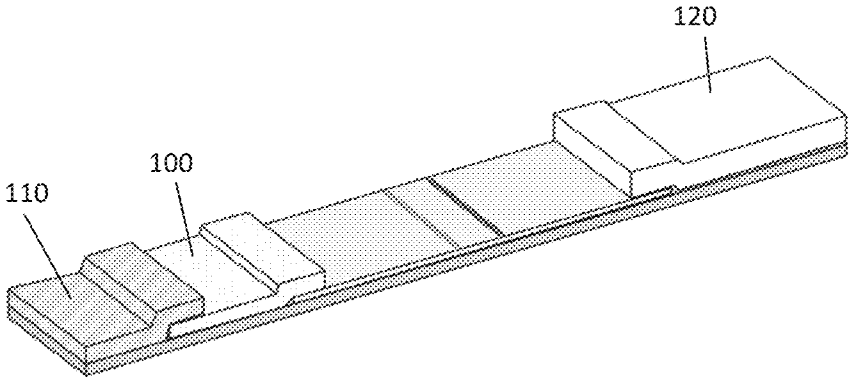
FIG. 1B Prior Art

FIG. 1B illustrates an alternative design of a lateral flow test, modified slightly from the design illustrated in FIG. 1A, where the sample pad is downstream of the conjugate pad. This simple modification may result in disqualification of unrestricted use because it requires the addition of two liquids, in two different locations, in the proper sequence and potentially within a specific time frame. The design in FIG. 1B is known to have superior sensitivity than the one shown in FIG. 1A due to the nature of its biochemical assay flow dynamics. However, despite its superior performance, it is often not used because of the potential for limiting the market opportunity it may otherwise have. In this design, the locations of the transfer or reagent pad (110) and sample pad (100) have been reversed. The sample is added first on the sample pad (100), and then a second liquid, such as a buffer or diluent or eluent, is added to the transfer or reagent pad (110). As in FIG. 1A, the bias is for flow to move downstream toward the absorbing pad (120). However, unlike in FIG. 1A, where the sample automatically resorbs conjugate when passing through the reagent or transfer pad (110) as it moves downstream, the sample in FIG. 1B does generally not pass through the reagent pad (110) during its downstream flow, due to the reverse placement of the sample and reagent pads (100), (110). Therefore, a second liquid must be added to the reagent pad (110) in order to drive the conjugate downstream into the sample pad (100). Due to this added level of complexity, this version may experience use restrictions imposed by regulatory authorities.

Although the lateral flow assay design is fairly versatile and robust, inexpensive to manufacture and easy to use, it has a few drawbacks that inherently limit its capability. Often, any attempt to reduce the extent or severity of these limitations also increases the complexity of the assay and leads to disqualification of unrestricted use, similar as to what was described for FIG. 1B.

Some of the other steps that have been implemented to improve the lateral flow assay's performance include manually measuring the sample volume before loading onto the strip, mixing the sample with a reagent before adding a measured amount of the combined volume onto the strip, and/or following the sample addition with a delivery of a liquid reagent either to the same location on the strip or to a secondary location, as previously described. Sometimes, the timing of the secondary liquid delivery is important to the device performing properly.

Although the introduction of a single additional processing step may not immediately disqualify the device, often, a single additional degree of complexity is not sufficient to improve performance. For example, it is often important to precisely measure the volume of an inputted sample in quantitative applications. However, in the case of blood, measuring the input sample volume is not sufficient to know how much of that blood, or its plasma content, actually flows to the test and control line. This is because the blood will separate into different components as it passes through the lateral flow pads and membranes. In fact, a specially designed plasma separation membrane is often used as a sample pad that allows only the non-cellular component of the blood to pass further into the test system. The problem is that the cellular component of the blood, measured as a volume fraction referred to as the person's hematocrit, differs from individual to individual depending on their age, sex, and general health. Therefore, even if the individual's blood volume is precisely measured before placing it in the inlet sample port, the actual volume of analyzed sample (plasma) being measured is still uncertain. Some manufacturers estimate that roughly 50% of the added blood volume actually reaches the test line in the form of plasma, and promote their assay as being semi-quantitative. However, this assumption, together with other flow inconsistencies associated with the lateral flow design, may add 20-50% variability in the resulting biomarker measurement, leading to high levels of error in repeatability and accuracy. This issue is known as hematocrit variability and is challenging for many diagnostic systems, not just lateral flow assays.

The reason this issue is important to highlight is because the clinical significance of different concentrations of biomarkers in blood is actually not referenced to the volume of blood being analyzed, but to the volume of plasma. For example, a measurement may be in the form of μg/mL, where the μg is the mass of the target biomarker per unit volume of plasma, in mL.

In lateral flow, this variability may be reduced by following the precisely measured sample with the addition of buffer, which may reduce the viscosity of a sample containing high hematocrit and ensuring that more plasma reaches the lateral flow (e.g., nitrocellulose) membrane. But in this circumstance, two additional steps have been added to the test procedure (initial sample measurement followed by the addition of buffer), and the exact volume of plasma reaching the lateral flow membrane is still not precise due to hematocrit variability.

The gold standard in sensitivity, repeatability, and specificity for diagnostic assays, especially for immuno-assays, is the Enzyme Linked Immunosorbent Assay, or ELISA process. However, this process is very complex, time-consuming, and requires specialized equipment and highly trained personnel to perform and interpret. Attempts to transform the lateral flow assay to achieve the characteristics of an ELISA invariably lead to the increased complexity that has been discussed, disqualifying it from unrestricted use.

Plasma Separation: The ideal method of eliminating or reducing hematocrit variability is to, first, separate whole blood into its components, such as by centrifugation, and then extract and measure a precise volume of plasma from this separation and add it to the input of the lateral flow assay. Of course, this method is quite complex and would disqualify the test from unrestricted use.

As was mentioned, PSMs have been developed for lateral flow. However, according to their specifications, these membranes must he placed on top of another membrane, of higher capillarity, so the plasma that is produced can be extracted and passed downstream. Conventional technology has not previously existed that allows the plasma that is produced by the PSM to be easily extracted, measured or metered, and placed back into the lateral flow system.

The reason it is stipulated by the manufacturer that the PSM be placed on another membrane to draw the plasma out of it is because, for every membrane with a hydrophilic nature, where aqueous liquids, including blood, naturally spread out across the membrane and penetrate into it, this membrane has a breakthrough pressure characteristic where, due to the capillarity of the membrane itself, the liquid is held tightly within the membrane pore structure and, at the interface between the downstream surface of the membrane and air, there is a pressure harder or capillarity barrier or capillary stop junction, where the small or microscopic pores of the membrane immediately transition to an open air structure where no capillary suction force exists. A force or pressure is needed to push the liquid in the membrane past this junction. By placing the PSM on another membrane with higher capillarity, this barrier or junction is eliminated and replaced with another structure that continues to provide a capillary-based suction driving force.

The key to causing plasma to be removed from the PSM, measured or metered, and placed back into the lateral flow system is to eliminate the breakthrough pressure of the PSM. Methods for eliminating this breakthrough pressure, and, hence, allowing the extraction, measurement, and re-introduction of plasma into the strip, have been detailed in previous patent disclosures from the current inventors, e.g., U.S. Pat. No. 10, 532,325, issued Jan. 14, 2020 and entitled "Capillary Pressure Re-Set Mechanism and Applications," which is incorporated herein by reference.

Figure 2A:
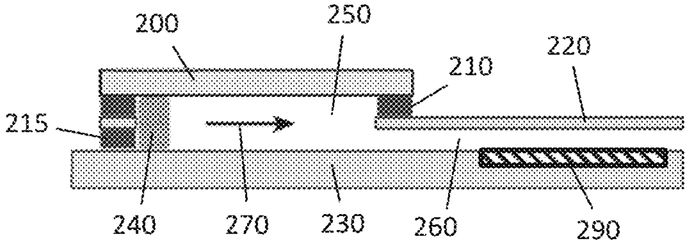
FIGS. 2A and 2B illustrate a cross-sectional view and perspective assembled and exploded views, respectively, of a layered structure useful for separating plasma from a whole blood sample and delivering a metered volume of said plasma to an integrated microchannel, according to an embodiment.

Referring to FIG. 2A, in accordance with one embodiment, a multi-layered laminate structure has been designed that uses a sample pad (200) placed in fluidic connection to a small microchannel (260). The sample pad (200) may be or include a filtration membrane, configured to extract a filtrate from a liquid sample placed on the sample pad (200), thereby separating the filtrate from a retentate remaining in or on the sample pad (200). When used for blood testing, the filtration membrane may be a PSM, e.g., of the same type as used in many conventional lateral flow devices, such as the Pall Vivid™ PSM), and the filtrate is blood serum or plasma. The term "filtrate" is used herein broadly to denote any liquid extracted from a sample pad, even if the sample pad provides no or only limited filtering function (as is the case, e.g., for a urine wick as described below with reference to FIG. 8) such that the extracted liquid includes substantially all (e.g., all except for impurities and macroparticles) of the components of the liquid applied to the sample pad (200).

With reference again to FIG. 2A, the sample pad (200) is attached to a base support (230) through multiple layers of material, e.g., a plastic layer that serves as the cover (220) of the microchannel (260) sandwiched between adhesive layers (210) and (215). Directly under the sample pad (200), cutouts in the adhesive layers (210), (215) and the channel cover (220) form a chamber of specific dimensions where the filtrate, such as plasma, pools, hereinafter referred to as the "filtrate pooling chamber" (250) (or, in the context of blood testing, a "plasma pooling chamber"). In the bottom adhesive layer (215), the cutout extends into the microchannel (260). The layers (210), (215), inasmuch as they laterally define the filtrate pooling chamber (250) and the microchannel (260) are hereinafter also referred to as the "pooling layer" and "channel layer," respectively. As indicated, these layers (210), (215) may be made of a self-adhesive material, but non-adhesive materials may also be employed, e.g., when gluing or bonding them to the sample pad (200) and base support (230).

Between the sample pad (200) and the bottom of the filtrate pooling chamber (250) (defined by the base support (230)) is a soluble matrix (240) that, initially, has high enough capillarity to draw, in a region where it is in direct contact with the sample pad (200), the filtrate (e.g., plasma) through the sample pad (200) (e.g., PSM). As filtrate fills the soluble matrix (240), it will encounter the bottom of the soluble matrix (240), which is in contact with the base support (230). The soluble matrix (240) then dissolves or disintegrates, leaving a portion of filtrate in the form of a meniscus bound on the top by the sample pad (200) and on the bottom by the base support (230). Due to the hydrophilicity of these two surfaces, and the continued flowing of filtrate through the sample pad (200) at this location, the meniscus begins to flow, as indicated by arrow (270), across the bottom surface of the sample pad (200), which breaks the capillary barrier, or breakthrough pressure, across the bottom surface of the sample pad (200), allowing the filtrate pooling chamber (250) to fill completely. As filtrate fills the filtrate pooling channel (250), the filtrate collection may extend into the microchannel (260), which thus serves as a filtrate collection channel. In the microchannel (260), the filtrate may encounter an integrated electronic, thermal, or optical element (290), which may be useful for some type of sensing, detection, thermal amplification, or other purpose useful for the application of the structure.

Figure 2B:
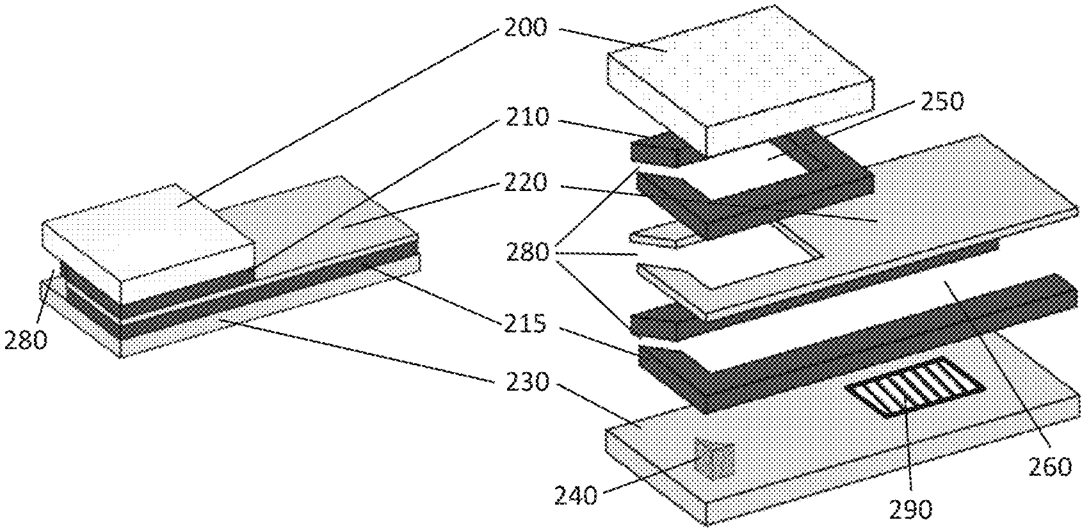

FIG. 2B illustrates the structure shown in FIG. 2A layer by layer, at a perspective angle in assembled and exploded views. Visible in this figure is a structural feature that is not seen in FIG. 2A, which is a vent (280) shown in the far-left corner of the device across the layers (210), (220), (215). As filtrate fills the filtrate pooling chamber (250), beginning at the location of the soluble matrix (240), it will eventually reach the entrance of the microchannel, or synonymously filtrate collection channel, (260). The capillary forces at the filtrate collection channel (260) are designed to be higher than those within the filtrate pooling chamber itself (250), and higher than a capillary barrier that may exist at the vent (280), so the filtrate that is pooled enters the filtrate collection channel (260) and is replaced with air that enters the chamber (250) through the vent (280). The soluble matrix (240) and the entrance to the filtrate collection channel (260) are, as shown, placed on opposite respective sides of the filtrate pooling chamber (250), such that filtrate transfer from the filtrate pooling chamber (250) into the filtrate collection channel (260) does not begin until the filtrate pooling chamber (250) is completely filled.

Typically, the movement of filtrate into the filtrate collection channel (260) is not vented through the sample pad (200), both because the sample pad (200) may be clogged, e.g., in the case of a PSM with cellular components of the whole blood, and because any venting flow through the sample pad (200) would be much slower than air flow through the vent (280) itself. Thus, to some degree, the breakthrough pressure condition of the sample pad (200) is re-established by re-introducing air to the bottom surface of the sample pad (200). As a result, as soon as the meniscus that moves across the filtrate pooling chamber (250) reaches the filtrate collection channel (260), the filtrate is drawn quickly into the filtrate collection channel (260), thereby emptying the filtrate pooling chamber (250), without filtrate being replenished through the sample pad (200). The volume of filtrate that fills the collection channel is, consequently, the same as the volume of filtrate that has pooled under the sample pad, and this volume is precisely controlled by the design and geometry of the physical structure, including the size and placement of the vent (280), soluble matrix (240), entrance to the microchannel (260), sample pad (200), and pooling chamber (250). The structure of FIGS. 2A and 2B, thus, provides metering functionality.

Figure 3A:
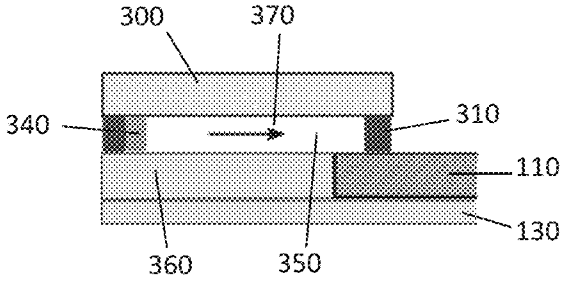
FIGS. 3A and 3B illustrate a cross-sectional view and perspective assembled and exploded views, respectively, of a layered structure useful for separating plasma from a whole blood sample and delivering a metered volume of said plasma to the conjugate pad of a lateral flow assay, according to an embodiment.
Figure 3B:
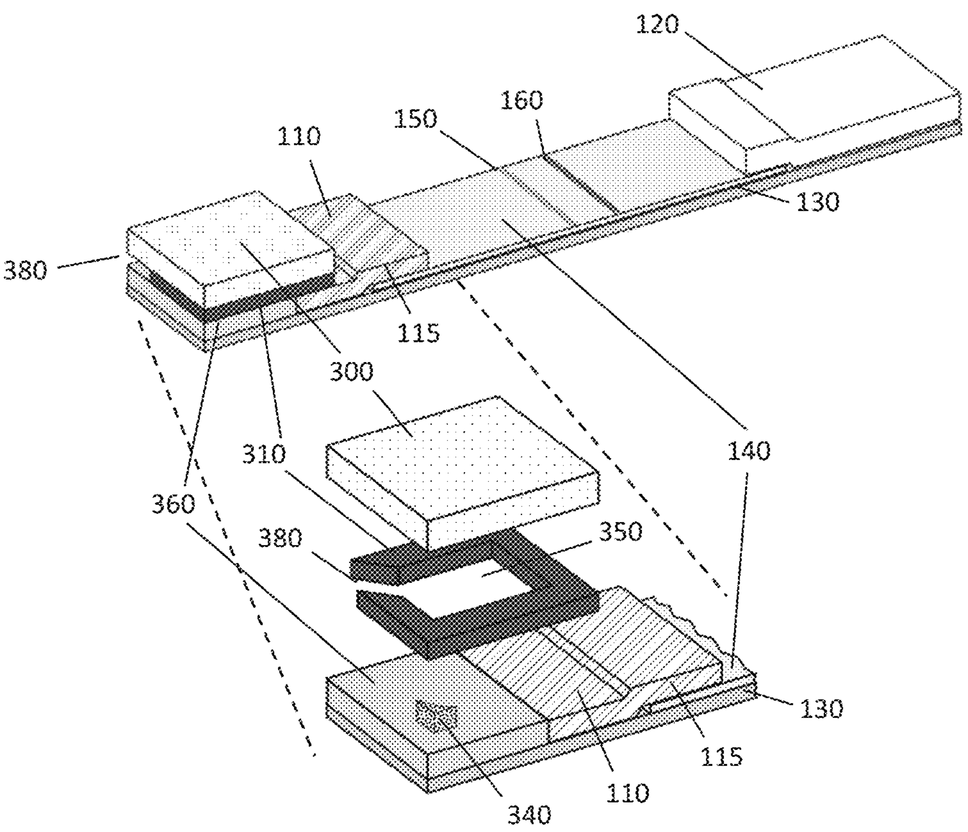

Instead of delivering the pooled filtrate to a filtrate collection channel (260), the filtration (e.g., plasma separation) structure can be modified, as is illustrated in FIG. 3A, to deliver the filtrate (e.g., plasma) to a membrane or pad, such as the transfer or reagent pad (110) of a lateral flow assay. FIG. 3B illustrates an oblique assembled and exploded view of how this would be implemented in the lateral flow assay design. Here can be seen that the sample pad (100) of FIG. 1A is replaced with a structure that includes, in addition to (e.g., the same) sample pad (300), an adhesive or other pooling layer (310), a plastic spacer (360), and the soluble matrix (340) to eliminate the breakthrough pressure of the sample pad (300). The plastic spacer (360) serves to elevate the filtration structure, e.g., to the same level as the transfer or reagent pad (110) on the strip. The transfer pad (110) forms a portion of the base surface of the filtrate pooling area (350), the other portion being formed by the plastic spacer (360). Similar to the microchannel design shown in FIGS. 2A and 2B, the filtrate pooling chamber (350) fills with filtrate starting at the location of the soluble matrix (340), until it is completely or almost completely filled and the filtrate eventually touches the transfer pad (110), which laterally overlaps with the filtrate pooling chamber (350). Once the migrating filtrate reaches the transfer pad (110), it will be quickly drawn into the pad (110) due to the capillarity of the pad (110), and the filtrate in the pooling area (350) will be replaced with air drawn in through the vent (380) formed in the pooling layer (310). The filtrate continues to flow downstream through the system, as described previously, including into the lateral flow membrane (140), due to the overlap area (115) with the transfer pad (110), through the result line (150), control line (160), and into the absorbing pad (120). As in FIGs. 1A and 1B, all membranes and pads are supported by a base card structure (130).

In both designs, that is, the microchannel and transfer pad designs of FIGS. 2A-2B & 3A-3B, the soluble matrix (240) or (340), generally, only partially dissolves and is held in place by the walls of the pooling and/or channel layers (210), (215), or (310), on two sides, the base support (230) or plastic spacer (360) at the bottom, and the sample pad (200) or (300) at the top. The portion of soluble matrix (240) or (340) that does not dissolve, and even a portion of the plasma that is dissolved in the soluble matrix (240) or (340), generally does not flow downstream of the filtrate pooling chamber (250), (350) due to flow dynamics of liquid passing by corners. The tight corner area is usually not sufficiently washed through, or evacuated, by the exiting filtrate. The portion of filtrate that remains in the pooling chamber due to corner effects will have to be carefully accounted for, and minimized by design, to ensure proper repeatability from strip to strip. This can be done to some degree by rounding corners so droplets do not remain in them, with the exception of the corner where the soluble matrix is located.

As has been mentioned, the Pall Vivid PSM has been used to separate plasma from whole blood in the manner disclosed. There are also other PSMs, such as single membranes, composites, or multiple layered membranes, that can be used for size-exclusion filtering. Sometimes glass fiber membranes are used, where the arrival of cellular components through the membrane is generally delayed, but the cellular components are not completely blocked as they are in the Vivid PSM. There are also chemistries used together with glass fiber membranes that capture cellular components biochemically, rather than through size-exclusion, that can be used. This includes agglutination chemistries that capture and bind red blood cells, forming large deposits on and within the membrane, blocking other red blood cells, white blood cells, and some platelets from passing completely through the membrane. The primary requirements are that the membrane used is hydrophilic, or can be rendered suitably hydrophilic by some secondary process that is known in the art, and that the desired portion of blood, in this case plasma, can be effectively separated, or aliquoted, from other blood fractions. It is also beneficial that the plasma pooling chamber does not refill with remaining plasma or some blood fraction within an appropriate timescale that is meaningful for correct device function, once the appropriate volume has been delivered downstream.

There are also other methods of overcoming the breakthrough pressure associated with size exclusion filters such as the Pall Vivid PSM. These include the use of electrical forces, application of negative (suction) or positive pressure across the membrane, use of a solvent or surfactant to eliminate the breakthrough pressure, mechanical manipulation of the membrane, or some other method typically more difficult to implement than the use of a soluble matrix as has been disclosed.

The disclosed method of plasma separation using a soluble matrix, and its associated capability of volume control and plasma delivery to downstream lateral flow components, has the necessary control and metering features that eliminates the hematocrit variability issues that have been discussed. The plasma is separated from whole blood, metered or measured, and delivered back to the lateral flow strip.

Also, this design, either as it is already disclosed or with a few additional features, has the ability to solve many other issues associated with reducing the complexity and number of processing steps required of a user associated with making lateral flow assays more quantitative or multiplexed, including steps that can lead to greater sensitivity and repeatability, with blood or other sample types.

Aliquoting, Metering, and Delivery: The method of plasma metering and re-introduction to the lateral flow system has an additional benefit in that the amount of plasma collected and delivered is independent of the amount of whole blood added to the system, provided a minimum amount of whole blood is added to account for possible variations in hematocrit. Ensuring that a minimum amount of sample is present is much easier than measuring the amount of sample precisely, and can be accomplished by mounting a fixed-volume inlet capillary tube in contact with the PSM or sample pad.

Figure 4:
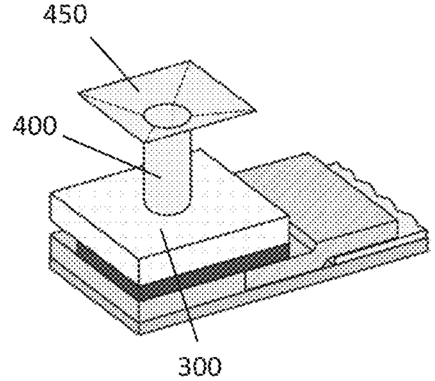
FIG. 4 illustrates the use of a capillary tube interface to the sample pad of a lateral flow assay for ensuring a minimal amount of sample is available to the assay for processing, according to an embodiment.

FIG. 4 illustrates an inlet capillary tube (400) in physical contact with the PSM or sample pad (300) of the structure of FIGS. 3A and 3B. The whole lateral flow device is not shown, just the relevant portions to illustrate the concept. The capillary tube (400) is uniform in diameter and sufficiently small in diameter that a drop of blood applied at the top of the capillary tube (400) does not run down the tube under its own weight, but is held at the top by capillary forces until another drop is added, pushing it down towards the sample pad (300). In this manner, the blood in the capillary tube (400) does not reach the sample pad (300) until the capillary tube (400) is filled, at which point it passes into the sample pad (300). The capillary tube (400) may be sized sufficiently large in volume, depending on the properties of the sample pad (300) and the volume of the plasma pooling chamber (350), to ensure that, once flow through the sample pad (300) and into the plasma pooling chamber (350) starts, there is a sufficient amount of blood in the capillary tube (400) to completely fill the pooling chamber (350) with plasma. If, beyond that, sample continues to be added to the capillary tube (400), the sample will also continue to flow to the sample pad (300), but will not effect an increase in the volume of plasma that is collected and passed downstream (due to the combined action of the liquid uptake by the transfer pad (115) and venting through the vent 380), but will either remain in the sample pad (300), or in the capillary tube (400) in the form of the original whole blood sample if the sample pad (300) is already saturated. To aid in delivering blood to the inlet capillary tube (400), an inlet funnel (450) may be used. Such a funnel design can aid in delivery of blood to the capillary (400), especially if the blood is added in a drop-wise fashion, such as from a blood droplet that may form on a fingertip when the finger is pierced with a lancet.

Thus, from the designs and methods described in FIGS. 3A-3B and 4, not only is the hematocrit variability problem eliminated, but the process of ensuring that an adequate specified minimum volume of sample is present is also simplified. While the inlet capillary tube (400) and its function have been described with reference to blood testing, the same structure can, of course, also be used to ensure delivery of at least a specified minimum sample volume to the sample pad (350) for other types of samples.

In general terms, the disclosed technology simplifies enhanced lateral flow assays by converting to an automatic or passive process what would otherwise be a complicated process including multiple manual steps on the part of the user, which may disqualify a device from unrestticted use. This simplification through an automated or passive process involves providing means to achieve or meet the following four characteristics or requirements:

1) Means to ensure adequate minimum volume;
2) Means to separate and/or aliquot;
3) Means to meter or measure; and
4) Means to deliver metered volume.

in the examples that have been discussed, these four characteristics have been satisfied by the following device features or design:

1) Means to ensure adequate minimum volume: By placing a capillary tube, or similar vessel, with an enclosed volume equal or greater than the required minimum sample volume in physical contact with the sample pad such that the sample does not reach the pad until the capillary tube, or similar vessel, is filled with the minimum volume.
2) Means to separate and/or aliquot: Using a filtration membrane, such as a PSM, to separate-out, or aliquot-out, only the desired portion of the sample, such as the plasma, and by using a soluble matrix to eliminate the breakthrough pressure of the membrane so that the plasma flows freely through the membrane with no additional external equipment or processing step on the part of the user.
3) Means to meter or measure: Ensuring the filtrate (or aliquot) pooling chamber under the membrane is of the precise dimensions needed to collect the required volume, and ensuring the filling of the pooling chamber takes place in a controlled manner so that an inadequate volume is not inadvertently delivered downstream.
4) Means to deliver metered volume: This is performed by providing a means of adequate venting and adequately fast removal of the aliquot from the pooling chamber, such that the pooling chamber is refilled with vented air before any additional sample passes into it through the membrane, and that the geometry of the pooling chamber is sufficient to prevent trapping of bubbles while filling or sample droplets while emptying in an unrepeatable or uncontrolled manner.

Figure 5:
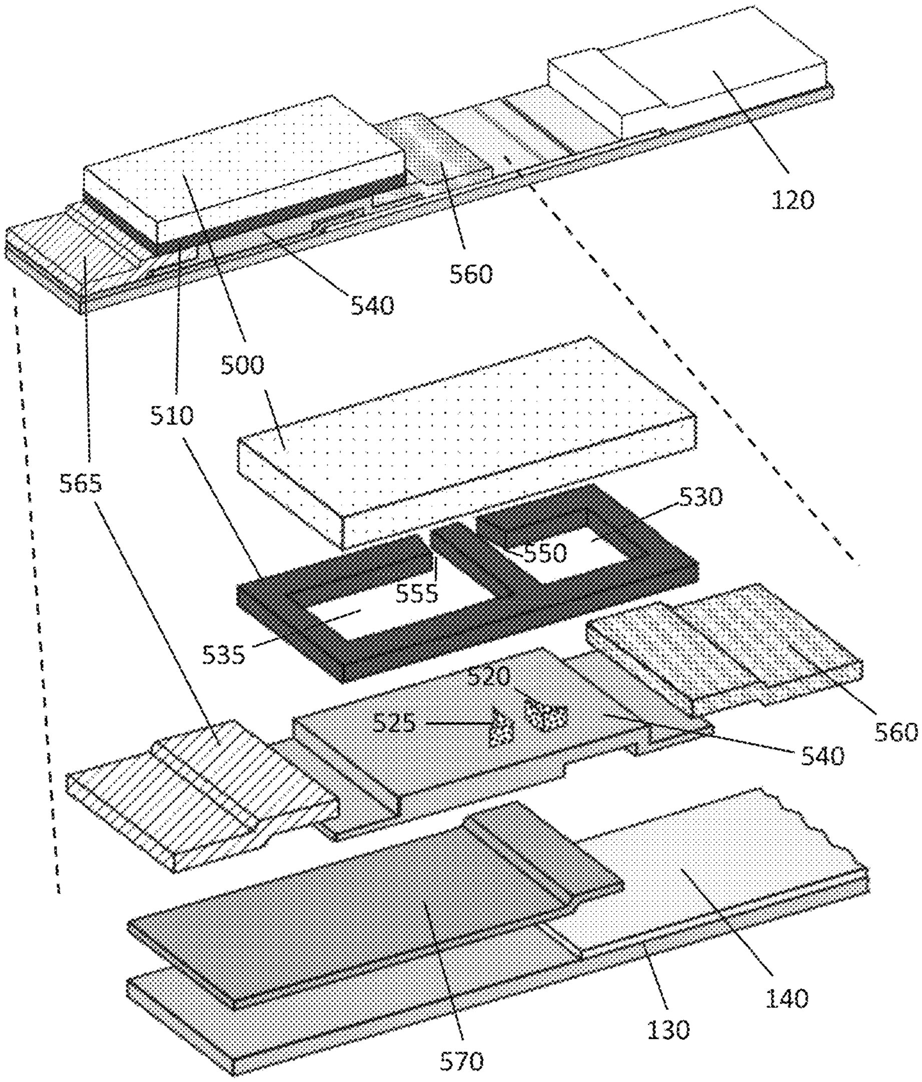
FIG. 5 illustrates perspective assembled and exploded views of a structure used for separating and metering two aliquots of a single sample for delivery to a lateral flow assay, according to an embodiment.
Figure 6:
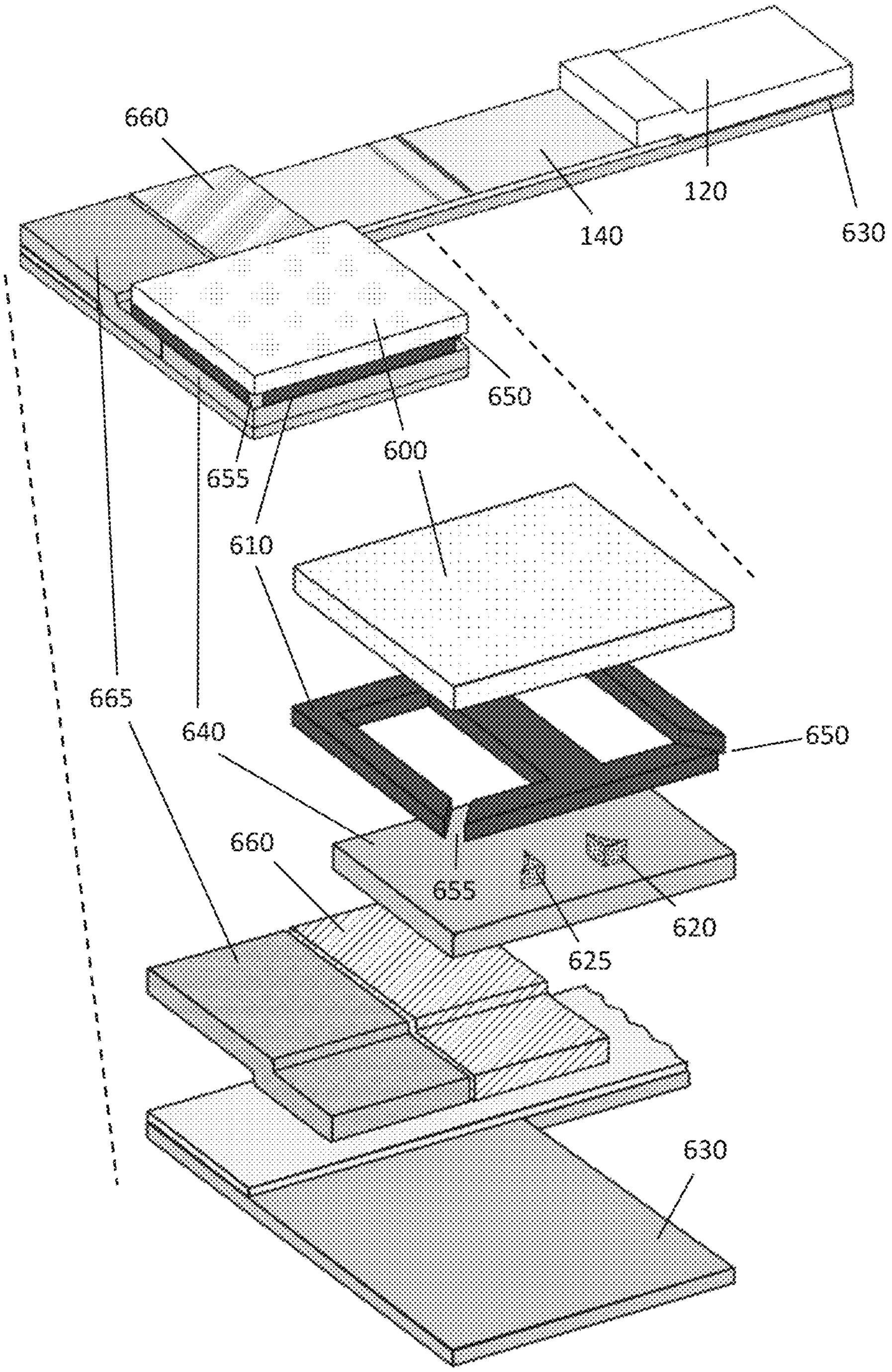
FIG. 6 illustrates an alternative geometry in perspective assembled and exploded views of a structure used for separating and metering two aliquots of a single sample for delivery to a lateral flow assay, according to an embodiment.
Figure 7:
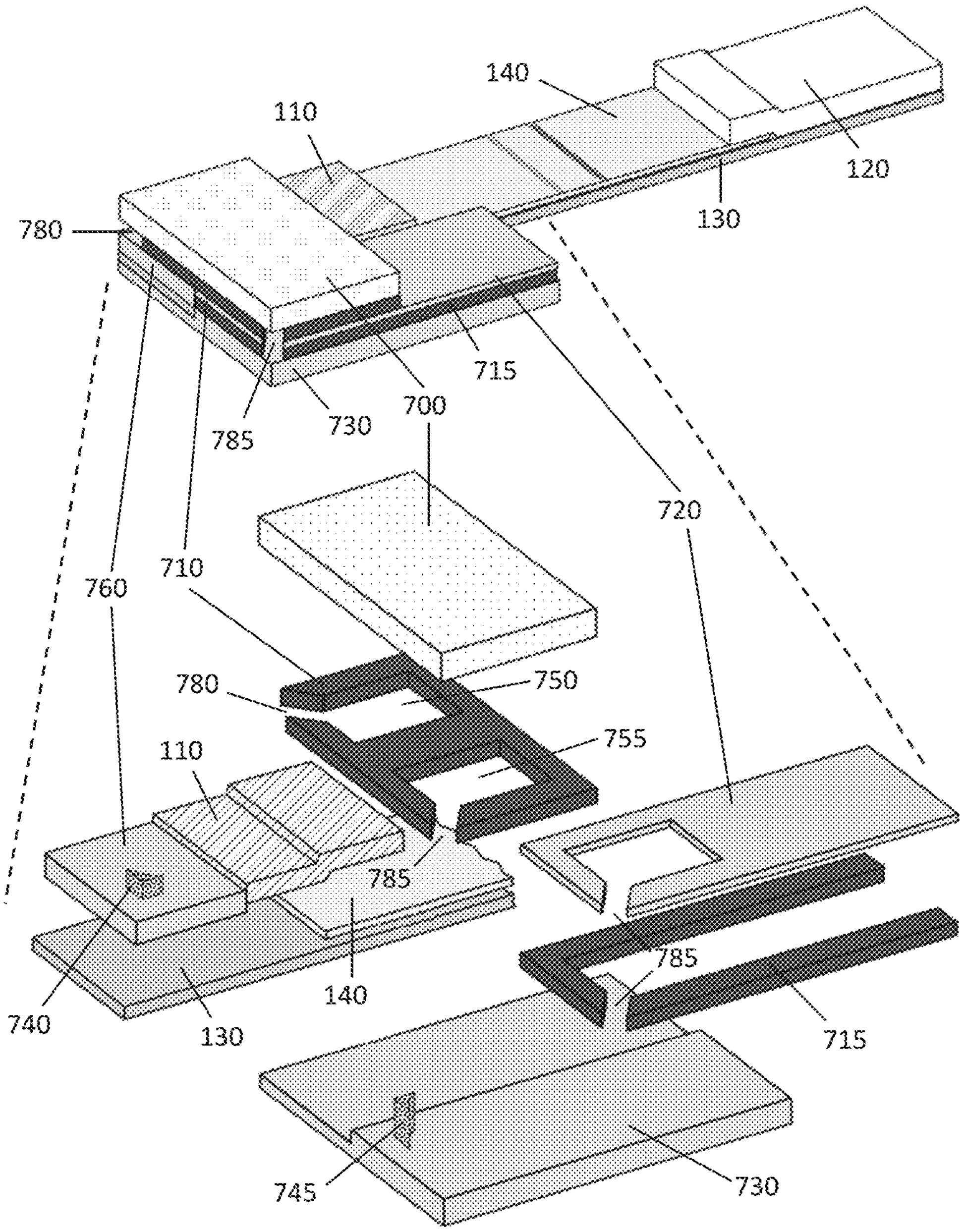
FIG. 7 illustrates perspective assembled and exploded views of a structure used for separating and metering two aliquots of a single sample for delivery to two separate diagnostic systems including one lateral flow assay and one microchannel, according to an embodiment.

FIGS. 5, 6, and 7 illustrate additional capabilities made possible by using the four design characteristics that have been described. In each of these figures, the capillary tube input, which satisfied design characteristic 1, is omitted to focus on the other relevant and new components.

As was illustrated in FIG. 1B and described previously, in some applications of lateral flow, it is beneficial for an aliquot of unmodified sample (i.e., unbound to or un-complexed with conjugate) to pass, and be captured by, the result line before the conjugate molecule arrives. This may be needed in case, due to flow or molecular dynamics, it is easier for the result line to capture the un-complexed target biomarker (which may be a small molecule) than it is to capture the biomarker that is already pre-complexed with the conjugate (a bigger structure than just the biomarker alone).

While this can be done already using existing technology, it usually involves two manual processing steps, such as adding the sample first, followed by the conjugate reagent, or a liquid buffer that passes through a conjugate pad that the previously applied sample does not pass through. Sometimes the liquid conjugate or buffer is applied at a different location than the sample. Sometimes there is a strict timing requirement associated with adding the second liquid. In either case, this method adds complexity to the process, which may, depending on the totality of relevant issues, disqualify the test from unrestricted use.

FIGS. 5 and 6 illustrate lateral flow assay device designs, in assembled and exploded perspective views, with non-relevant parts cut away in the exploded view, of how a single sample can be separated, aliquoted, metered, and delivered to generate two different aliquots (of equal or different volumes) that are delivered to the downstream lateral flow strip independently of each other, and how each aliquot can pass through separate transfer pads (e.g., conjugate or reagent pads) and be delivered across the result and control lines in a sequential, rather than combined, manner.

For the discussed example where an unmodified (or un-complexed) sample must pass by the result line first, the first transfer pad (560) shown in FIG. 5 contains no conjugate and only serves to provide a flow path to deliver the unmodified aliquoted sample to the lateral flow membrane (140) containing the result and control lines. The second aliquot is passed through the second transfer pad (565), which contains the conjugate needed for the detection. To facilitate the aliquoting, sample is delivered to the two transfer pads (560) and (565) from respective filtrate or aliquot pooling chambers (530) and (535). To form the aliquot pooling chambers (530) and (535), as shown, the transfer pads (560) and (565) may be placed to both sides of a plastic spacer (540), and an adhesive or other pooling layer (510) placed on top of the plastic spacer (540) and partially overlapping with the transfer pads (560), (565) may define the lateral boundaries of the aliquot pooling chambers (530) and (535), with the sample pad (500) placed on top of the pooling layer (510) providing the upper boundary. The aliquoting processes uses two separate soluble matrices (520) and (525) as well as two separate vents (550) and (555) associated with the two aliquot pooling chambers (530) and (535). The second aliquot may be of the same size as the first or of a different size, as controlled by the volumes enclosed in the aliquot pooling chambers (530) and (535)

It is important to recognize that the sample, e.g., plasma, is primarily composed of benign aqueous liquid (>85%) with various simple or complex biochemical or biomolecular components as is normal for the sample. It may, or may not, contain any of the target biomarker and, even if it does contain the target biomarker, the volume of non-biomarker components, specifically benign aqueous liquid, is present in much greater abundance than the target biomarker. In other words, provided the conjugate reagent present in the transfer (or reagent) pad 2 (565) is in excess of the concentration of target biomarker that may be present in aliquot 2 (or aliquot 1 combined with aliquot 2), some unbound conjugate will pass the result and control lines, which is the desired condition in this example. In this situation, there is very little difference between resorbing the conjugate in buffer compared to resorbing the conjugate in an aliquot of the sample.

In FIG. 5, the two aliquots from pooling chambers (530) and (535) are delivered, via the transfer pads (560) and (565), to two different membranes (140) and (570) (e.g., nitrocellulose membranes), which are in physical contact with one another in an overlap region. In one design, the two membranes have different capillarities, where the primary membrane (140), or lateral flow membrane, has a higher capillarity than the secondary membrane (570), so the unmodified sample flowing through transfer pad 1 (560) does not proceed very far upstream (in the opposite direction of the result and control lines), and the bulk of the fluid flows downstream, across the result and control lines. If the secondary membrane (570) has a lower capillarity than the primary membrane (140), the fluid in the primary membrane (140) will not transfer, to any great extent, into the secondary membrane (570). However, the liquid in the secondary membrane will have no difficulty in transferring into the primary membrane. The secondary membrane (570) can also simply be described as a transport membrane that may not serve a biochemical function other than to transport aliquot 2, which has passed through transfer pad 2 (565), downstream to the primary membrane (140), which contains the result and control lines.

In an alternative design, instead of differing in capillarity, the two membranes (570) and (140) shown in FIG. 5 have different flow rates. In this case, the primary membrane (140) should have a faster flow rate than membrane 2 (570), so that the unmodified sample does not proceed very far into the secondary membrane (570) before it encounters aliquot 2 moving downstream in the secondary membrane, which would then cause the majority of flow to move downstream the primary membrane, across the result and control lines.

In the design shown in FIG. 5 all pads and structures are in a linear format, which may be beneficial for some requirements. FIG. 6 illustrates an alternative design, in which the two aliquots of the sample are both delivered directly to the lateral flow membrane (140), and the separation and aliquoting takes place at the side of the primary strip structure, generating an type design. In this case, it is desirable that both aliquots are delivered to the lateral flow membrane (140) at about the same time so that neither one significantly delays or obstructs the absorption of the other into the lateral flow membrane (140).

Like the lateral flow device of FIG. 5, the device of FIG. 6 uses two separate transfer pads (660) and (665), two separate aliquot pooling chambers (defined in the same pooling layer (610)), two separate soluble matrices (620) and (625) to achieve separation, and two separate vents (650) and (655) to facilitate flow into both transfer pads (660) and (665). Similar to FIG. 5, there is a single PSM or sample pad (600) defining the top of the aliquot pooling chambers, hound on the edges by the pooling layer (610), and on the bottom by the plastic spacer (640) and respective transfer pads (660) and (665). Although two separate aliquots are produced, they are both delivered to the lateral flow membrane (140), side by side at two different locations in the direction of flow along the membrane (140). All membranes and pads, including on the 'L' shaped extension, can be supported by the same base card structure (630).

Instead of an unmodified sample being delivered first, followed by an aliquot of the sample having passed through a reagent pad filled with dried conjugate, the same strip configurations can be used to deliver two different reagents, one in transfer or reagent pad 1 (660) and one in transfer or reagent pad 2 (665), to the downstream system (both mixed with sample). Alternatively, transfer pad 1 (660) could be filled with conjugate and transfer pad 2 (665) could be unfilled and serve just as a flow path to deliver a wash of unmodified sample, or conjugate-free sample, across the result and control lines. In yet another case, the same strip designs could be used to deliver two different conjugates, one in each transfer (or, in this case, conjugate) pad, in the case the application is for a multiplexed assay, where two different biomarkers are being detected.

FIG. 7 illustrates a related configuration where a single sample is aliquoted into two aliquots using a single PSM or sample pad (700), but two soluble matrices (740) and (745) in two pooling chambers (750) and (755) formed in a single adhesive layer (710) with two vents (780) and (785). The difference from the configurations of FIGS. 5 and 6 is that the first aliquot is delivered to a reagent or transfer pad (110) that is a component of a lateral flow assay, similar to the device illustrated in FIG. 3, while the second aliquot is delivered into the pooling chamber associated with a microchannel, similar to the device illustrated in FIG. 2. The microchannel is defined laterally by a channel layer (e.g., an adhesive layer) (715) and vertically between a plastic base (730) on the bottom and a cover (720) on the top. Both systems are jointly supported by the plastic base (730), which extends to support the lateral flow base card structure (130) with its associated membranes and pads and an additional plastic spacer (760) that forms a portion of the bottom structure of the first aliquot collection chamber (750). In the manner illustrated, a single sample can be aliquoted between two different diagnostic systems, for whatever application that is desired.

Precious vs. Abundant Samples: In the examples discussed thus far, the sample has been primarily whole blood. Although the volume of sample has not been specified, it has been assumed to be available in only limited amounts. The development of modern in-vitro diagnostics, including lateral flow assays, has been to drive down the volume of required blood to something that is available from just a finger-stick, which can be achieved by the user alone. This volume may be on the order of 2-50 μL, or one small- to medium-sized drop. Samples larger than about 50 μL, may be available if the user is able, and willing, to either force a larger drop to develop before placing it on the device, or by adding more than one drop. The time it may take to add more than one drop can begin to influence the performance of the device, including complications associated with clotting and increased viscosity of the blood. The smaller the volume required by the device, the easier it is to use, and the more likely it will qualify for unrestricted use in a commercial setting.

For the sake of discussion, blood is considered a precious sample type, because it is, typically, only available in small volumes, Larger volumes, such as 100-500 μL can certainly be obtained, but this is usually only possible by a venous-draw, rather than a finger-stick, and is usually only available when a skilled technician is available to withdraw the sample from the individual being tested. New technologies are under development that are intended to be able to withdraw larger volumes, such as 150 μL, by unskilled users, but this does not influence the discussion regarding samples that are precious vs. abundant.

Samples that are available in larger volumes, such as 1 mL or more, will be referred to as abundant. In this case, the type of testing or design of testing device is not restricted to the volume of sample that may be present. In the case of abundant samples, there is limited effort or need to force the design of the diagnostic to work with smaller and smaller volumes. An example of an abundant sample is urine.

Of course, there are exceptions to both of these examples, where blood may be available is larger volumes, such as 1 mL or more, and hence abundant according to our definition, and urine may be available in only a small volume such as what may be withdrawn or collected from an infant. These terms are only used as descriptive indicators that influence the design of a diagnostic, rather than as strict categories.

The ability to aliquot, deliver multiple aliquots for multiple reagent deliveries, deliver unmodified sample, wash, etc., as has been described and made possible using the four design characteristics that have been outlined, can be extended further to perform additional automatic processing steps, and can be used with virtually any sample type, precious or abundant, whether the sample is blood, urine, saliva, or water, all of which are typically liquids, or stool, tissue swabs, food, soil, unknown powders, or other typically solid samples that have been mixed with a liquid buffering agent.

In the case of precious samples, these additional processing steps may take place with the aid of a breakable ampule filled with liquid buffer or other suitable liquid agent or reagent, or a squeezable bladder filled with liquid, or a similar structure that can release a suitable liquid volume for delivery to a lateral flow strip in the manner described, and to be described, in an automatic fashion. Such structures and their releasing or actuation systems are known in the art and not described further.

Figure 8:
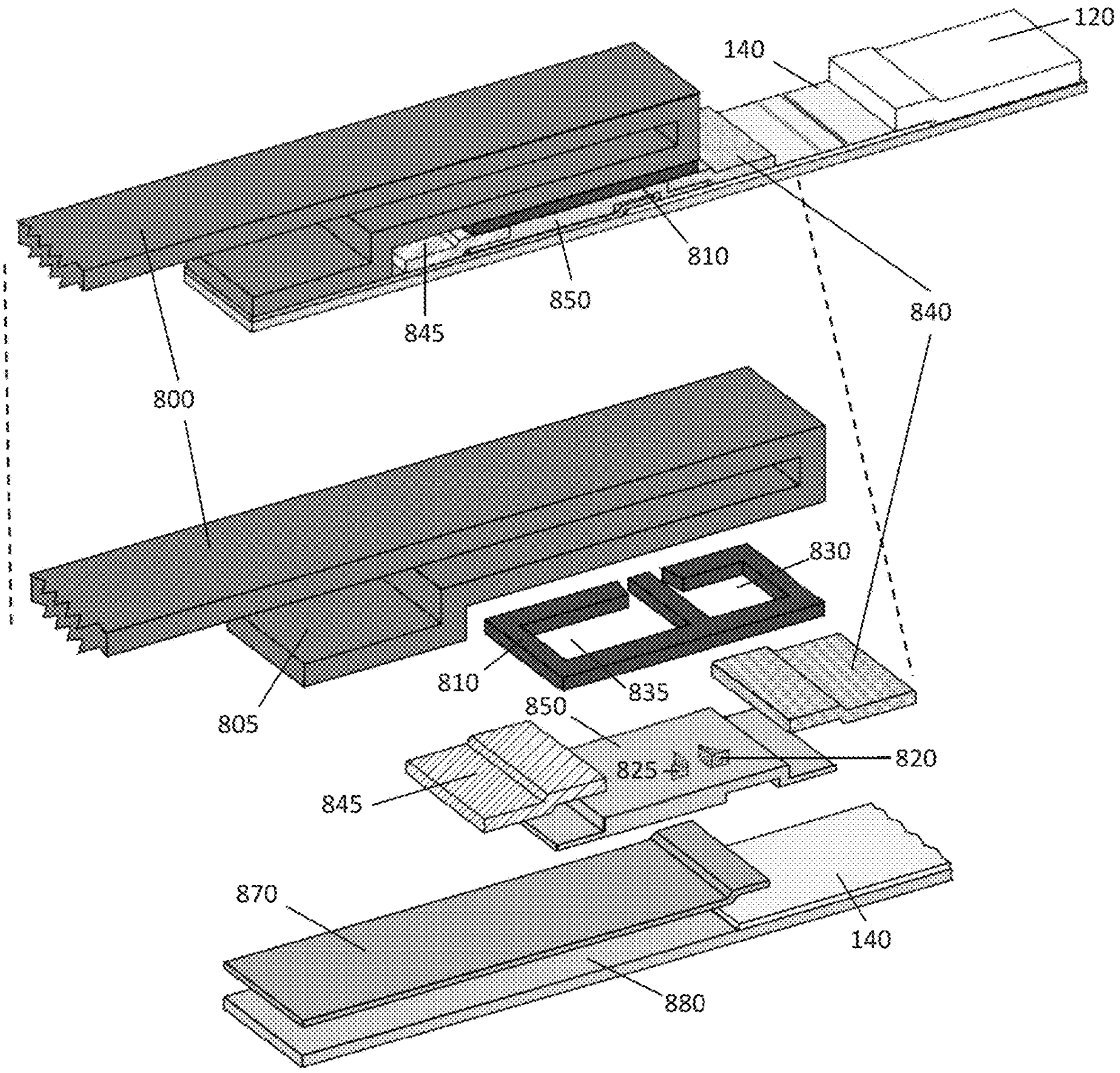
FIG. 8 illustrates perspective assembled and exploded views of a structure used for separating and metering three aliquots of an abundant (urine) sample for delivery to a lateral flow assay, according to an embodiment.

However, in the case of an abundant sample, such as urine, FIG. 8 illustrates multiple sample and reagent delivery steps, all automatic, that make use of a continuous flow of urine entering the lateral flow system, such as if the illustrated urine wick (800) were placed in a cup with a suitable amount of sample (>1 mL).

Urine wicks are available commercially and commonly used in lateral flow pregnancy tests. They comprise different materials depending on their manufacturer, but are often made of porous plastics, which can be formed into different shapes. The shape shown in FIG. 8 folds back on itself to ensure that the abundant liquid flowing along the wick (800) encounters the aliquot pooling chamber 830 closest to the result and control lines before it reaches the pooling chamber (835), such that an unmodified sample aliquot is separated and delivered, via the transfer pad (840) to the lateral flow membrane (140) before other aliquots. This U-turn or folding feature may not be necessary in practice, but is illustrated here nonetheless.

In the exploded perspective view, it can be seen that the urine wick (800) is treated the same and acts in a similar manner as the sample pad (or PSM) in FIG. 5. Two aliquots are separated, metered, and delivered through the structures shown as the pooling layer (810), which forms two aliquot pooling chambers (830) and (835), with the bottom of the aliquot pooling chambers formed by a plastic base (850) and two transfer pads (840) and (845). Because the urine wick (800) is hydrophilic, the soluble matrices (820) and (825) placed inside the pooling chambers (830) and (835) will eliminate the breakthrough pressure and allow liquid to exit the wick (800). The liquid will pool in each of the chambers (830) and (835), with its meniscus propagating along the chamber until it reaches the respective transfer pad (840) or (845). From the pad (845) farther upstream of the result and control lines, the liquid is transferred to the transport membrane (870), which, in turn, overlaps with and transfers the liquid to the lateral flow membrane (140).

A new feature and capability is also illustrated in FIG. 8, at the end of the urine wick (800). This end portion (805) of the wick is in direct contact with the transport membrane (870). The transport membrane (870) has unspecified pore size, but a higher capillarity than the urine wick (800) itself, so that liquid is drawn into the transport membrane (870) under capillary forces. In this case, the abundant sample flow will be continuous and will pass from the urine wick (800) directly to the transport membrane (870), where it continues to flow downstream into the primary, lateral flow membrane (140). This continuing flow of the unmodified sample liquid along the lateral flow membrane (140) may serve, e.g., to push the aliquots delivered from the aliquot pooling chambers (830) and (835) over the result and control lines, as well as to wash away any background deposits that would interfere with and/or contribute to the noise in the measurement.

With a sample being abundant, and as illustrated in FIG. 8, with the extension of the urine wick (800) in the end portion (805), a condition of continuous flow can be established until either the source has completely emptied through the system, or the absorbing pad (120) on the far downstream end of the lateral flow strip, which is the driving force of liquid flow for the whole device, has become saturated and is no longer able to absorb liquid. Even if flow continues, though, the effectiveness of the assay could end if all necessary reagents are resorbed and washed past the result and control lines. If the resorption of reagents is slow, even, and continuous, or can be replenished with little or no interruption, the effectiveness of the assay can continue until the sample is gone or the absorbing pad is saturated. One could conceive of a condition when the duration of a test could be for a very long period, even quasi-continuous, if the absorbing pad is very large or is replaced with little or no interruption, or the liquid that has been absorbed is displaced out in some manner, such as by evaporation. Eventually, though, all membranes, pads, and surfaces would likely be clogged or saturated with biomolecules, fouling the flow path with debris, reducing the effectiveness of the test over time.

With the ability to aliquot multiple volumes of an abundant sample, including the ability to perform sub-micron filtering of an individual aliquot, or implement additional automatic liquid deliveries through the use of integrated breakable ampules or squeeze bladders, many liquid delivery scenarios and processing steps can be performed. These processing steps may begin to approach the sensitivity, repeatability, and specificity of ELISAs. These include single or multiple washing steps, delivery of enzymatic amplification reagents, precise timing of liquid deliveries, and other capabilities.

Many membrane or pad types have been developed for the lateral flow industry that have various capillarities, linear flow speeds, volumetric flow rates, thicknesses, separation capabilities, reagent resorption profiles or efficiencies, adsorption blocking features, etc., all of which provide enormous flexibility in design of a lateral flow system. Many additional capabilities have been developed for what is referred to as 'paper-based' diagnostics, or two-dimensional lateral flow technology, where lateral flow is referred to as one-dimensional or linear (not necessarily an accurate use of terminology).

However, despite the new capabilities introduced by paper diagnostics, they are still limited by similar weaknesses as are associated with traditional lateral flow, such as volume control, hematocrit variability, and manual processing steps on the part of a user, which the presently disclosed technology, at least in part, solves.

Despite the sophistication, accuracy, and new capabilities available or presently disclosed to assay designers, there will always be some factors imposed on the capabilities of diagnostics that will limit them. These include usage or storage environmental factors, which can influence flow rates, reagent resorption, and other parameters due to humidity, temperature, or other uncontrollable factors. These factors cause a device to perform in a manner that may deviate from its intended function. Other factors that limit device function include cost, market pressures, and manufacturing quality control.

Alternatives to Membrane Overlap: As has been described, flow of liquid in a lateral flow assay typically moves from the upstream position near the far left edge of the strips, e.g., as illustrated in FIGS. 1A and 1B, to the right or toward the absorbing pad or wick (120). This is due to the balance of capillary forces that exist and the preference for a liquid to move in the direction of a dry membrane or pad due to the capillary forces that draw it there. Due to overlapping of membranes, the capillary force is mostly continuous throughout the system, although its magnitude may vary depending on the composition and structure of the various membranes the liquid encounters. The overlapping or touching of membranes to facilitate continued flow is a very useful phenomenon. However, in many examples of more complex structures, such as when aliquots of samples are delivered to multiple points on the membrane(s) of a strip, , e.g., as illustrated in FIGS. 5 and 8, the flow of the first aliquot is far downstream of the second aliquot, and flow of the first aliquot will be in both directions, including, at least to some degree, flowing in the wrong direction through the overlapping regions, at least until it encounters the second aliquot which, generally, pushes flow back in the downstream direction. While this upstream flow of some of the initial aliquot may be tolerable in the performance of the assay in some circumstances, there may be other circumstances where it is detrimental to the performance of the assay.

In addition, lateral flow assays are, typically, very robust systems due to the advantageous nature of liquid flow through membranes and pads, or paper in general. Although not without sources of error and inconsistencies, the advantages of paper-based fluidics include uniform and sequential flow, the ability to store reagents in a dry format and, later, resorb them on demand, the ability to chemically modify flow paths to achieve different flow functionality and, very importantly, the open nature of the paper system which can eliminate problems associated with trapping bubbles in micro-flow systems. While lateral flow and paper-based systems have many desirable features, they do suffer from some disadvantages that may cause one to desire a way to extract liquid out of the membrane, do something with it, and then put it back in the membrane and allow the assay to continue. Some of the steps that would benefit from removing liquid from a membrane-based system, at least temporarily, include metering the volume of liquid passed downstream (as is the function of the separation and metering of plasma that has been described, but other liquids may also be metered), mixing a liquid with another liquid or a solid reagent that cannot be stored within a membrane, passing the liquid over a surface for a process that cannot adequately take place in a membrane (such as passing plasma over a biosensor as was illustrated in FIG. 2), and overcoming flow limitations associated with paper-based flow such as the thickness and pore size of the paper, which limits the size of particles, such as glass or magnetic beads, which may be useful for a particular assay.

Figure 9:
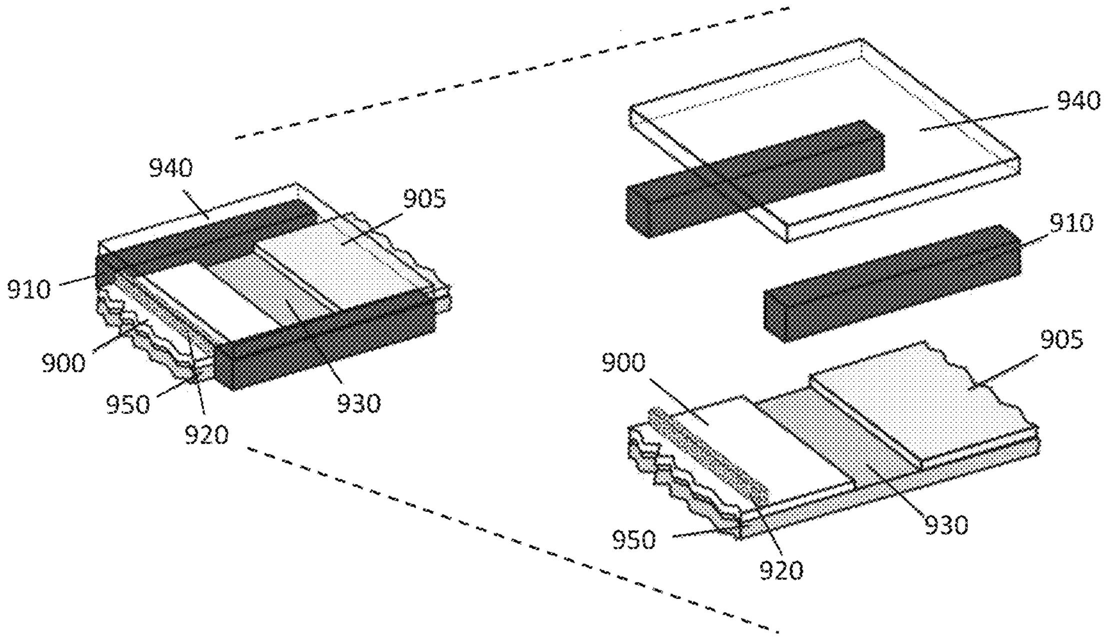
FIG. 9 illustrates perspective assembled and exploded views of a structure used for bridging across two incompatible membranes by drawing liquid out of one membrane and delivering it to another, according to an embodiment.

A method for extracting liquid from a membrane is illustrated in FIG. 9. This illustration shows a device with an initial or first membrane (900), a second membrane (905) (e.g., both made of nitrocellulose), with a gap (930) separating the two, and a soluble matrix (920) used to draw liquid out of the initial membrane (900). Similar to its function in removing liquid from a sample pad, the soluble matrix (920) draws liquid into it upon contact with liquid coming from upstream in the system. When the liquid in the initial membrane (900) encounters the gap (930) and cannot proceed further, the favorable capillarity of the soluble matrix (920) will draw it out of the membrane (900) at the point of contact with the membrane (900). As the liquid fills the soluble matrix (920), it will reach the top of the soluble matrix (920), which contacts a strongly hydrophilic surface, e.g., the underside of a cover (940), such as a glass cover slip or hydrophilicity treated plastic, disposed above the gap (930) and extending from the first membrane (900) to the second membrane (905) so as to "bridge" the gap (930). That "bridge cover" (940) may be supported by adhesive or other walls (910) extending along the gap (930). As the soluble matrix (920) dissolves or disintegrates and releases the liquid into the space underneath the bridge cover (940), a meniscus forms between the first membrane (900) at the bottom and the bridge cover (940) at the top. This meniscus may travel along the bridge cover (940) and, upon passing into the gap (930), proceed as a meniscus between the bridge cover (940) and a base support (950) of the lateral flow system, on which the first and second membranes (900), (905) rest. To encourage the liquid within the structure to continue downstream from the first membrane (900) and into the gap (930), which could represent a capillary barrier, the adhesive walls (910) may be sloped downward, causing the hydrophilic cover to slope downward, which increases the capillary drawing forces as a function of distance downstream, until the liquid encounters the second membrane (905), which has sufficient drawing force to continue to drive flow through the system.

The gap (930) between the two membranes (900) and (905) may be small, or large, depending on the needs of the application. The gap (930) may expose the base support (950) of the lateral flow system, or another structure that is inserted in the space (not shown). There may be nothing inside the gap, or the gap can be filled with a reagent, a microarray printed on the base support, a sensor of some kind, or another structure. Although there are many potential applications, the concept is to be able to bridge liquid flow from one membrane to another when either a gap in the membranes is desired or overlapping the membranes would not allow for efficient continuation of flow in the correct downstream direction. This may be the case if the capillarity of the initial membrane (900) is higher than the capillarity of the second membrane (905), or if liquid placed downstream moves too far upstream, including through a membrane overlap, leading to potentially deleterious assay results, or if the bottom surface of one or both membranes is closed rather than open, preventing the option of an overlap for allowing continuous flow. Many membranes or pads in lateral flow are open-cell type structures, where the cross section from top to bottom is mostly symmetrical. In some cases, they are so symmetrical that the top and bottom cannot be distinguished from one another. However, due to various manufacturing processes, in some cases the bottom surface of a membrane may be closed or partially closed, reducing the efficiency of flow through this surface. In this case, the membrane can only accept liquid entering through the top surface, which may create limitations on how it can be used. This method of bridging between two membranes can remove this limitation.

Figure 10:
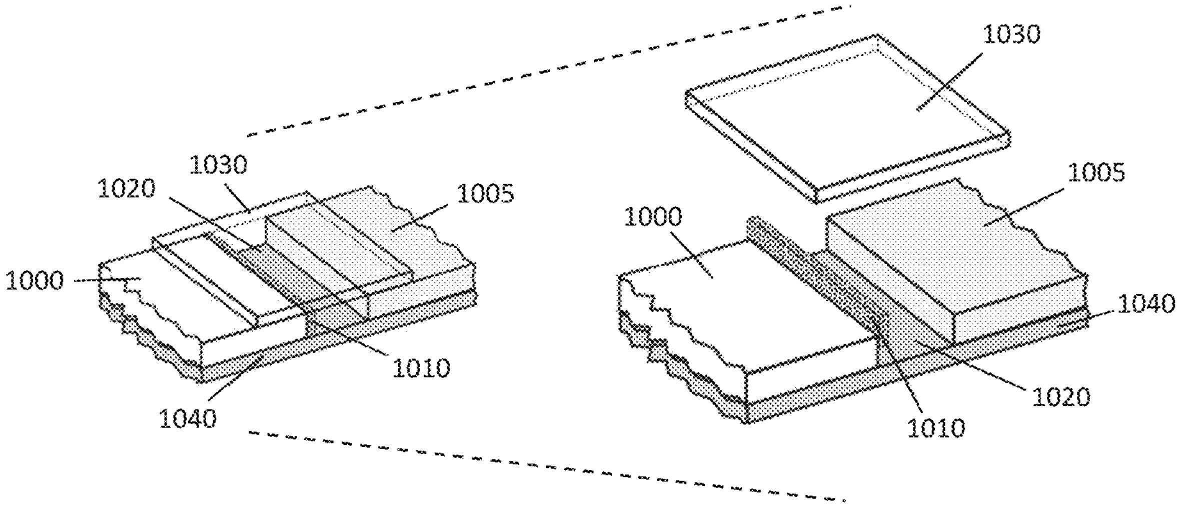
FIG. 10 illustrates perspective assembled and exploded views of a structure used for ensuring unidirectional flow when bridging across two incompatible membranes, according to an embodiment.

Also, the soluble matrix does not need to be on the top surface of the initial membrane. FIG. 10 illustrates an alternative design where, if the initial membrane (1000) is thick enough to accommodate it, such as around 300 μm or thicker (a common thickness for sample pads or reagent pads), the soluble matrix (1010) could be inside the gap (1020), but in physical contact with the end face or downstream end of the initial membrane (1000), bound on the bottom by the base support (1040), and at the top by the bridge cover (1030). Adhesive side walls may not be needed in this case and are not shown in FIG. 10. A thin coating of adhesive may be used to secure the bridge cover to the two membranes. Once flow is established across the bridge, the continued direction of flow will be governed by pressure gradients within the system, and it is possible that flow could go from the second membrane (1005) to the initial membrane (1000), although this would not be possible initially. In the case of FIG. 10, there is no step down into the gap when the membrane ends as there is in FIG. 9; however, it is still advantageous for the hydrophilic cover (1030) to be sloped downward in the downstream direction. This can be achieved by the initial membrane (1000) being similar in thickness as a sample pad, with the second membrane (1005) being a nitrocellulose membrane, which is usually much thinner.

Lateral Flow Microarrays: Another disadvantage of paper-based fluidics is the limited diffusion of biomolecules, due to the liquid flow being closely associated with the internal paper structure. This creates 'shadowing' effects, or 'hooking', where biomolecules are blocked by physical structures in the flow path, such as the structure of the biomolecules comprising the result and control lines, which limits multiplexing ability. Errors or inconsistencies in flow, such as shadowing, are not 'healed' effectively by continued flow or path-length distances.

In a development unrelated to lateral flow, microarrays have shown considerable advantages in performing highly multiplexed assays. The ability to lay-down or print biomolecules including proteins, nucleic acids, and other structures, from a few to hundreds of thousands in a small area, can provide substantial amounts of data about the nature of a sample. To be effective, microarrays are usually washed thoroughly to eliminate background signals or noise, and some technologies have also been implemented to facilitate mixing in the very small volumes or geometries that are typically present.

Numerous attempts have been made to apply microarray technology, or high density multiplexing, to lateral flow assays. Unfortunately, the disadvantages of flow in paper systems impose strict limitations on the ability to multiplex, hence the attempts to combine the two technologies have not met with much success. However, the ability to draw liquid through or out of a pad or membrane, such as has been disclosed herein, to transition from paper flow dynamics to bulk or microfluidic flow, and back into paper if desired, can provide the necessary capability to overcome the limitations of paper-based flow and combine the advantages of both technologies.

Figure 11:
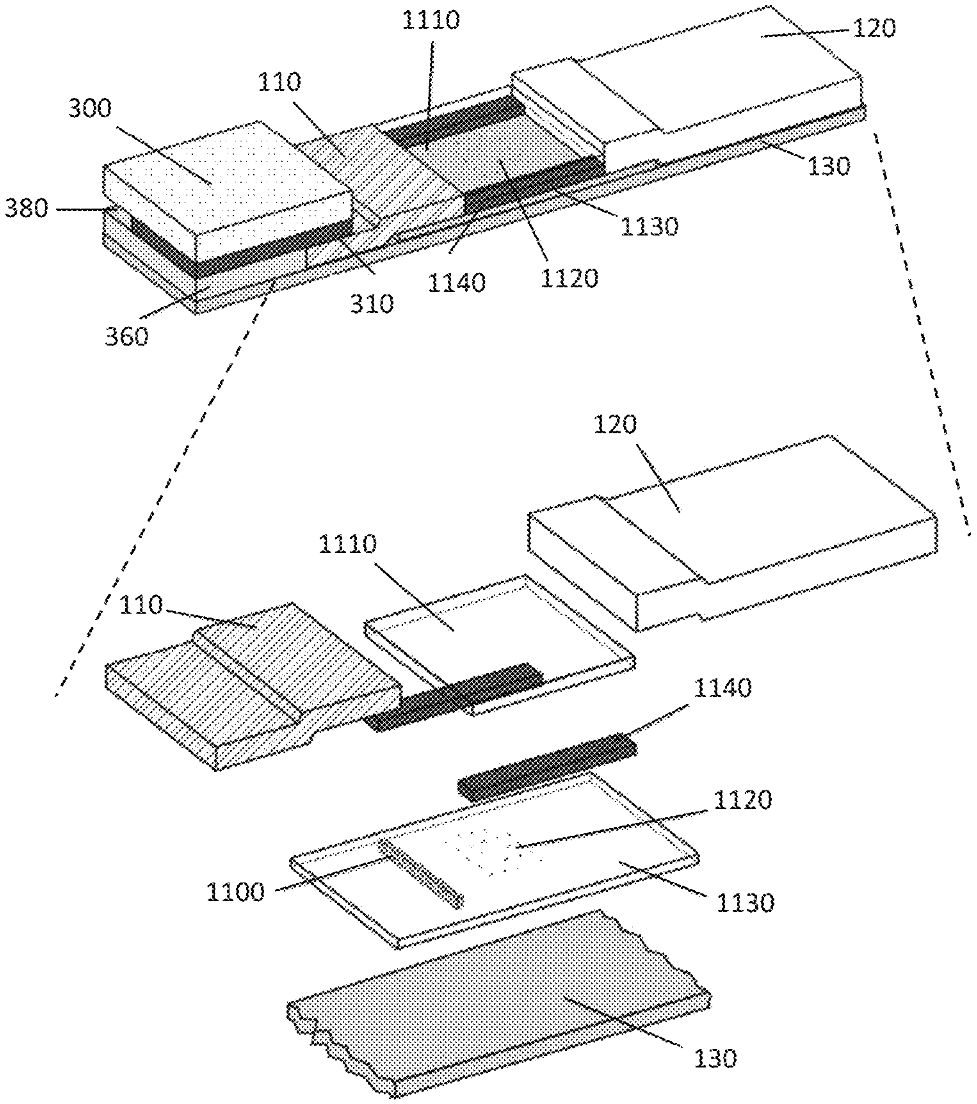
FIG. 11 illustrates perspective assembled and exploded views of a structure used for drawing liquid out of a lateral flow membrane or pad and into a microarray structure, according to an embodiment.
Figure 12:
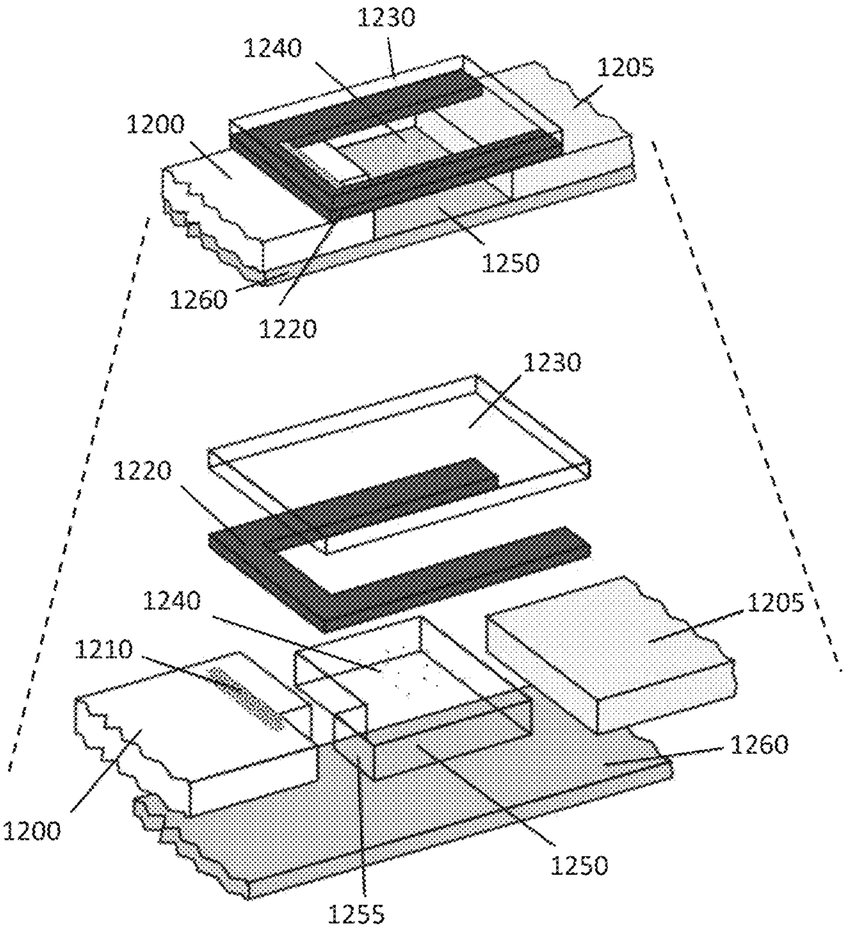
FIG. 12 illustrates perspective assembled and exploded views of an alternative structure used for drawing liquid out of a lateral flow membrane or pad and into a microarray structure, according to an embodiment.

FIGS. 11 and 12 show illustrations of how the combined lateral flow and microarray technologies can be implemented using the disclosed method of extracting liquid from paper, membranes, or pads. In each case, the flow moves back into paper downstream of the microarray due to the advantageous nature of the absorbing pad for driving continued flow through the system.

FIG. 11 depicts a device similar to the lateral flow device shown in FIG. 3B, where sample extracted from a sample pad 300 pools in a filtrate pooling chamber (defined inside pooling layer 310) before being delivered to a reagent or transfer pad (110), but in FIG. 11, the lateral flow membrane is replaced with the base (1130) of a microarray (1120), which could be a glass or silicon slide, as is common, or a nitrocellulose membrane. A soluble matrix (1100) contacting both the reagent pad (110) and a transparent window (1110), such as a glass cover slip, disposed above the microarray and supported by walls (1140), is used to draw liquid out of the reagent pad (110) of the strip and delivering it to the base (1130) of the microarray (1120). If the base (1130) is a nitrocellulose membrane, a portion of the liquid stream passes through the membrane and a portion of the stream passes above, or on top of, the membrane. Flow above the base (1130) provides headroom of bulk flow above the microarray (1120) to reduce or eliminate the shadowing or hooking effect that has been described. Once past the microarray (1120), the liquid is reintroduced to the absorbing pad (120), which drives continued flow through the system, including array washing or other steps that may be needed. The transparent window (1110) functions like a bridge cover between the transfer pad (110) and the absorbing pad (120), allowing formation of the meniscus between the transparent window (1110) and the base (1130), in a manner similar as described with respect to FIGS. 9 and 10, that causes liquid to proceed downstream. (The other labels in FIG. 11 are the same as they are referenced in earlier figures.)

The advantage of the headroom or liquid layer above the nitrocellulose or other microarray base is to allow for improved diffusion of biomolecules, compared to what is possible in the membrane, and to allow the use of larger particles, labels or beads, compared to what is possible in a membrane. If the headroom is large enough, it is possible that magnetic-based stirring or mixing could also be achieved, to maximize the ability of the result line or microarray to encounter its target in the sample. It is likely that magnetic stirring would need to be actuated from above, so that magnetic particles do not disturb the microarray itself. This may pose a challenge for imaging the array from above, for result detection, but could be done if the magnetic particles can be removed from the imaging path after mixing is finished.

FIG. 12 is a combination of the concepts illustrated in FIGS. 9 and 11. Here, liquid is drawn from the top of the initial membrane (1200) by the use of a soluble matrix (1210) and passes over a microarray (1240), but the initial membrane (1200) and second membrane (1205) do not overlap the microarray base (1250), but are butted up against the microarray base, where the membranes and microarray base are on approximately the same level or are of approximately the same thickness (e.g., differing in thickness by less than 30%, preferably less than 10%). The transparent microarray cover (1230) lies on top of an adhesive layer (1220) that reaches across the initial membrane (1200), the microarray (1240), and the second membrane (1205). The initial membrane (1200) and the microarray base (1250) may have an alignment notch (1255) to facilitate positioning during assembly. The notch (1255) may also facilitate liquid passing over any gap that may exist between the initial membrane (1200) and the microarray base (1250). This notch (1255) could be rectangular, as shown, or triangular, or of another shape as may be beneficial for overcoming potential surface inconsistencies, as is known in the art.

The advantage of the design illustrated in FIG. 12 is that the distance between the microarray base (1250) and cover (1230) can be kept very small, such as less than 100 μm, compared to designs illustrated in other figures. This will facilitate flow out of the initial membrane (1200) and across the array (1240) due to increased capillarity associated with smaller dimensions of hydrophilic materials.

Although the inventive subject matter has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A lateral flow assay device comprising:

a lateral flow membrane;

a transfer pad overlapping and in contact with the lateral flow membrane;

a spacer laterally adjacent to the transfer pad;

a pooling layer disposed on top of the spacer and the transfer pad, the pooling layer laterally defining a filtrate pooling chamber;

a sample pad disposed on top of the pooling layer, the filtrate pooling chamber being vertically defined between the sample pad on one side and the spacer and transfer pad on the other side; and a soluble matrix contained in the filtrate pooling chamber and in contact with both the sample pad and the spacer, the soluble matrix possessing a capillary drawing force sufficient to draw, upon application of a liquid sample to the sample pad, a filtrate extracted from the sample pad into the soluble matrix, causing the soluble matrix to at least partially dissolve or disintegrate in the filtrate, whereby the filtrate is released into the filtrate pooling chamber for delivery from the filtrate pooling chamber via the transfer pad to the lateral flow membrane.

2. The lateral flow assay device of claim 1, further comprising a vent in the pooling layer, wherein the vent, soluble matrix, transfer pad, filtrate pooling chamber, and sample pad are configured to facilitate transfer of a metered aliquot of the filtrate from the filtrate pooling chamber to the transfer pad.

3. The lateral flow assay device of claim 1, wherein the sample pad is or comprises a filtration membrane configured for separating the filtrate from a retentate contained in the liquid sample.

4. The lateral flow assay device of claim 1, further comprising an inlet capillary tube of uniform diameter and configured to deliver at least a specified minimum volume of the liquid sample to an upstream surface of the sample pad.

5. The lateral flow assay device of claim 1, further comprising an additional transfer pad, the pooling layer further laterally defining an additional filtrate pooling chamber containing an additional soluble matrix, the additional filtrate pooling chamber vertically defined between the sample pad and the spacer and additional transfer pad.

6. The lateral flow assay device of claim 5, wherein the transfer pad and the additional transfer pad are placed on opposite sides of the spacer, the device further comprising a transport membrane overlapping with the lateral flow membrane, the transfer pad overlapping with the lateral flow membrane and the additional transfer pad overlapping with the transport membrane.

7. The lateral flow assay device of claim 6, further comprising a base card structure, wherein at least portions of the lateral flow membrane and the transport membrane are disposed on the base card structure and the spacer is disposed on the lateral flow membrane and the transport membrane.

8. The lateral flow assay device of claim 6, wherein the sample pad is a portion of a wick configured such that the liquid sample flowing along the wick reaches the filtrate pooling chamber before it reaches the additional filtrate pooling chamber.

9. The lateral flow assay device of claim 8, wherein the wick comprises a second portion that is in direct contact with the transport membrane.

10. The lateral flow assay device of claim 5, wherein the transfer pad and the additional transfer pad are placed side-by-side on a same side of the spacer and both overlap with the lateral flow membrane.

11. The lateral flow assay device of claim 10, further comprising an L-shaped base card structure comprising first and second portions extending in substantially mutually perpendicular directions, the lateral flow membrane being disposed on the first portion of the L-shaped base card structure, and at least portions of the transfer pad and the additional transfer pad and the spacer being disposed on the second portion of the L-shaped base card structure.

12. The lateral flow assay device of claim 1, further comprising a channel base, a channel layer on top of the channel base, and a channel cover on top of the channel layer, the channel base, channel layer, and channel cover collectively defining a microchannel, wherein a portion of the pooling layer is disposed on top of the channel cover, wherein the portion of the pooling layer and an opening in the channel cover together laterally define an additional filtrate pooling chamber, the additional filtrate pooling chamber vertically defined between the sample pad and the channel base and fluidically connected to the microchannel, the additional filtrate pooling chamber containing an additional soluble matrix in contact with both the sample pad and the channel base, the additional soluble matrix possessing a capillary drawing force sufficient to draw additional filtrate through the sample pad and into the additional soluble matrix, causing the additional soluble matrix to at least partially dissolve or disintegrate in the additional filtrate, whereby the additional filtrate is released into the additional filtrate pooling chamber for delivery from the additional filtrate pooling chamber to the microchannel.

13. The lateral flow assay device of claim 12, further comprising an electronic, thermal, or optical element in the microchannel.

14. A method comprising:

providing a lateral flow device comprising:

a lateral flow membrane, a transfer pad overlapping and in contact with the lateral flow membrane, a spacer laterally adjacent to the transfer pad, a pooling layer disposed on top of the spacer and the transfer pad and laterally defining a filtrate pooling chamber, a sample pad disposed on top of the pooling layer to vertically define the filtrate pooling chamber between the sample pad on one side and the spacer and transfer pad on the other side, and a soluble matrix contained in the filtrate pooling chamber and in contact with both a downstream surface of the sample pad and the spacer;

extracting filtrate from the sample pad passively under capillary action to fill the filtrate pooling chamber, wherein the soluble matrix is used to overcome an initial breakthrough pressure of the sample pad, the soluble matrix at least partially dissolving or disintegrating in and thereby releasing the extracted filtrate into the filtrate pooling chamber, causing a meniscus to form between the downstream surface of the sample pad and a bottom surface of the filtrate pooling chamber, the meniscus to flow across the downstream surface of the sample pad as the filtrate continues to be drawn into the filtrate pooling chamber;

drawing the filtrate from the filtrate pooling chamber into the transfer pad; and drawing the filtrate from the transfer pad into the lateral flow membrane.

15. The method of claim 14, further comprising metering the filtrate by venting the filtrate pooling chamber through a vent in a wall of the filtrate pooling chamber as the filtrate is drawn into the transfer pad.

16. The method of claim 14, further comprising extracting filtrate from the sample pad passively under capillary action to fill an additional filtrate pooling chamber, using an additional soluble matrix placed in the additional filtrate pooling chamber in physical contact with the downstream surface of the sample pad to overcome the initial breakthrough pressure of the sample pad.

17. The method of claim 16, further comprising drawing the filtrate from the additional filtrate pooling chamber into an additional transfer pad that forms a partial boundary of the additional filtrate pooling chamber, drawing the filtrate from the additional transfer pad into a transport membrane overlapping with the additional transfer pad, and drawing the filtrate from the transport membrane into the lateral flow membrane in a region of overlap between the transport membrane and the lateral flow membrane.

18. The method of claim 17, wherein the sample pad is a portion of a wick, the method further comprising drawing liquid sample directly from the wick into the transport membrane in a region of overlap between the wick and the transport membrane, the region being downstream, along the wick, of the sample pad.

19. The method of claim 16, further comprising drawing the filtrate from the additional filtrate pooling chamber into a microchannel.

* * * * *